US010152845B2

(12) United States Patent
Pawloski

(10) Patent No.: US 10,152,845 B2
(45) Date of Patent: Dec. 11, 2018

(54) GAMING MACHINE AND GAMING METHOD

(71) Applicant: Ainsworth Game Technology Limited, Newington (AU)

(72) Inventor: Jason Pawloski, Sydney (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 81 days.

(21) Appl. No.: 15/152,150

(22) Filed: May 11, 2016

(65) Prior Publication Data

US 2017/0301177 A1 Oct. 19, 2017

(30) Foreign Application Priority Data

Apr. 18, 2016 (AU) ................................ 2016202450

(51) Int. Cl.
*A63F 13/00* (2014.01)
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC .. G07F 17/32; G07F 17/3213; G07F 17/3244; G07F 17/34
USPC ........................................................... 463/20
See application file for complete search history.

(56) References Cited

U.S. PATENT DOCUMENTS 6,120,378 A 9/2000 Moody et al.
6,234,897 B1 5/2001 Frohm et al.
7,070,503 B2 7/2006 Rudolph
7,736,222 B2 6/2010 Casey et al.
8,231,452 B2 7/2012 Suda et al.
8,292,724 B2 10/2012 Marks et al.
8,292,739 B2 10/2012 Iverson et al.
8,419,519 B2 4/2013 Aoki et al.
8,517,816 B2 * 8/2013 Joung ................. G07F 17/3265 463/16
8,628,403 B2 * 1/2014 Cole ................... G07F 17/3223 463/13
8,662,983 B2 3/2014 Wadleigh
2005/0288090 A1 12/2005 Thomas et al.
2008/0167115 A1 7/2008 Singer et al.
2009/0227351 A1 9/2009 Yoshizawa
2010/0216540 A1 8/2010 Berman et al.
2010/0279760 A1 11/2010 Sugiyama
2013/0079108 A1 * 3/2013 Lafky ................. G07F 17/3211 463/25
2013/0344939 A1 12/2013 Aoki et al.
2014/0045572 A1 2/2014 Li (Continued)

FOREIGN PATENT DOCUMENTS

AU 2014204417 1/2015

*Primary Examiner* — Allen Chan
(74) *Attorney, Agent, or Firm* — Cook Alex Ltd.

(57) ABSTRACT

The invention provides a gaming machine comprising a display for displaying a game in which game symbols are randomly displayed in an array of game positions. A game controller designates at least one of the game positions as a special game position in the array and randomly determines a bonus prize associated with the special game position. A special symbol appearing in the special game position in the play causes the game controller to award the bonus prize associated with the special game position. A method is also provided.

22 Claims, 16 Drawing Sheets

(56) References Cited

U.S. PATENT DOCUMENTS

| | | | |
|---|---|---|---|
| 2014/0066170 A1 | 3/2014 | Aoki et al. | |
| 2014/0179398 A1 | 6/2014 | Vandaele | |
| 2014/0335934 A1* | 11/2014 | Meyer | G07F 17/34 463/20 |
| 2015/0018070 A1 | 1/2015 | Meyer | |
| 2015/0057068 A1 | 2/2015 | Burghard | |

* cited by examiner

GAMING MACHINE AND GAMING METHOD

BACKGROUND

The present invention relates to a gaming machine. The invention has been developed primarily for use as an electronic gaming machine and will be described hereinafter by reference to this application. However, it will be appreciated that the invention may also be implemented for any type of gaming machine, including a mechanical or electro-mechanical gaming machine.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

One type of gaming machine comprises a mechanical or electro-mechanical device, where a motor rotates a plurality of annular rings or drums that form reels. Each reel has a reel strip that displays game symbols in preset game symbol positions. A frame covers the rings to provide a window through which only a subset of game symbol positions (and hence game symbols) were visible to the player. Thus, for a game using a 5×3 array, the window would only permit three rows of five rings to be visible to create the game array. An internal game controller within the gaming machine controls operation of the motor and hence rotation of the reels. Thus, by controlling when each reel starts and stops in its respective rotation, the game controller controls the display of the game symbols in the window. Sensors linked to the reels indicate which game symbols are displayed in the window and communicate with the game controller so that the game controller is able to award prizes based on winning combinations of game symbols displayed on the reels in the window. The game controller typically comprises one or more electric circuits for controlling various functions of the gaming machine, such as the above mentioned control of the motor, communicating with the sensors, verifying that the correct amount of a bet has been made via one or more value receiving mechanisms to enable operation of the motors, controlling any visual and/or audio effects associated with operation of the gaming machine and controlling operation of various alarms to alert any tampering with the gaming machine.

Another type of gaming machine, known as an electronic gaming machine or EGM, replaces the mechanical reels and motor with a video display screen on which video images of the reels are displayed. The EGM has an internal electronic game controller, typically a computer, that controls the display of images on the video display screen so that the reels are visibly spun on the screen to simulate a physical reel of a traditional gaming machine. EGMs tend to be more versatile in providing game information, varying the probabilities for a player to win a prize and varying the type of game that is played.

Bonus or "feature" games may also be provided by a gaming machine in addition to a base or main game. Typically feature games use the same set of reels as the main game and are limited to a set of free games operated under a single set of rules. This means that the feature game is restricted by the same set of rules, and so there is no variation in the play of the feature game. Also, gaming machines can offer one or more bonus prizes to the player during play of the game. The most common type of bonus prize that is awarded by the gaming machine is a jackpot prize, the main example of which is a progressive jackpot prize.

This standard structure to game play and bonus prizes limits the operation of the gaming machine, irrespective of whether it is a mechanical, electro-mechanical or electronic gaming machine. Consequently, it is difficult to retain player interest because there is no apparent incentive for the player to continue playing the gaming machine once the player becomes familiar with the feature game, the main game and any bonus prizes.

It is an object of the present invention to overcome or substantially ameliorate one or more of the disadvantages of prior art, or at least to provide a useful alternative.

SUMMARY

The present invention provides a gaming machine that has improved operation and performance relative to existing prior art gaming machines by providing an enhanced prize award system that is able to award bonus prizes in a manner directly observable by the player during operation of the gaming machine.

One embodiment of the invention provides a gaming machine comprising:

a display for displaying a game, wherein said game comprises game symbols arranged into an array of game positions and where predetermined winning combinations of randomly selected game symbols in said game award prizes to a player, and a game controller for controlling the display of said game symbols on said display, wherein said game controller designates at least one of said game positions as a special game position on said array in a play of said game and randomly determines a bonus prize associated with said special game position; and wherein a special symbol appearing in said special game position in said play causes said game controller to award said bonus prize associated with said special game position.

Another embodiment of the invention provides a gaming machine comprising:

a display for displaying a game, wherein said game comprises game symbols arranged into an array of game positions and where predetermined winning combinations of randomly selected game symbols in said game award prizes to a player, and a game controller for controlling the display of said game symbols on said display, wherein said game controller is configured to:

- designate at least one of said game positions as a special game position on said array in a play of said game;
- randomly determine a bonus prize associated with said special game position;
- randomly determine the display of said game symbols and one or more special symbols in the game positions on the array;
- determine whether at least one special symbol has appeared in said special game position in said play; and in response to an appearance of said at least one special symbol in said special game position, cause said gaming machine to award said bonus prize associated with said special game position.

A further embodiment of the invention provides a gaming machine comprising:

a display for displaying a game to be played on said gaming machine;

a game controller for controlling operation of the gaming machine, said game controller comprising:

a display controller for controlling the display of game symbols on said display, wherein said display controller is configured to arrange said game symbols into an array of game positions on said display;

a game assessor for determining whether one or more predetermined winning combinations of randomly selected game symbols appear in said game positions on said array;

a game position selector for designating at least one of said game positions as a special game position on said array in a play of said game; and a variable prize selector for randomly determining a bonus prize that is associated with said special game position; and a game symbol selector for selecting the location of said game symbols in said game positions and said special game position;

wherein said game position selector designates said special game position on said array in a play of said game;

said variable prize selector randomly determines said bonus prize;

said display controller randomly determines the display of said game symbols and one or more special symbols in the game positions on the array;

said game symbol selector randomly selects said game symbols for displaying said game position and special game position; and in response to said at least one special symbol in said special game position, said game assessor causes said gaming machine to award said bonus prize associated with said special game position.

A further embodiment of the invention provides a gaming machine comprising:

a display for displaying a game, wherein said game comprises game symbols randomly displayed in an array of game positions and predetermined winning combinations of randomly selected game symbols award prizes to a player;

a game controller for controlling the display of said game symbols on said display, wherein said game controller designates at least one of said game positions as a special game position on said array in a play of said game and randomly determines a bonus prize associated with said special game position; and a value transfer mechanism for receiving value from said player, wherein said game controller communicates with said value transfer mechanism to determine whether a threshold amount of value has been received to initiate a play of said game;

wherein upon receipt of said threshold amount of value from said player via said value transfer mechanism, said game controller commences said play; and wherein a special symbol appearing in said special game position in said play causes said game controller to award said bonus prize associated with said special game position.

Yet another embodiment of the invention provides a method of operating a gaming machine comprising a display and a game controller, the method comprising the steps of:

controllably displaying game symbols for playing a game, wherein said game comprises game symbols and predetermined winning combinations of randomly selected game symbols award prizes to a player;

arranging said game symbols into an array of game positions;

designating at least one of said game positions as a special game position in said array in a play of said game;

randomly determining a bonus prize associated with said special game position; and in response to a special symbol appearing in said special game position in said play, awarding said bonus prize associated with said special game position.

A yet further embodiment of the invention provides a method for a gaming machine comprising a display for displaying a game, a game controller for controlling the display of said game symbols for playing said game on said display; and a value transfer mechanism for receiving value from said player to initiate a play of said game, the method comprising:

said value transfer mechanism receiving value from said player;

determining whether said received value meets a threshold amount and if so, said game controller initiates said play of said game;

said game controllably displaying game symbols for playing a game, wherein said game comprises game symbols and predetermined winning combinations of randomly selected game symbols award prizes to a player;

arranging said game symbols into an array of game positions;

designating at least one of said game positions as a special game position in said array in a play of said game;

randomly determining a bonus prize associated with said special game position; and in response to a special symbol appearing in said special game position in said play, awarding said bonus prize associated with said special game position.

A further embodiment of the invention provides a computer system comprising a central processing unit configured for communication with a gaming machine, wherein said computer system is configured to perform the method of any one of the above described embodiments of the invention.

A further embodiment of the invention provides a computer programme configured to perform the method of any one of the above described embodiments of the invention.

A further embodiment of the invention provides a non-transitory carrier medium carrying computer executable code that, when executed on a central processing unit configured for communication with a gaming machine, causes the central processing unit to perform the method of any one of the above described embodiments of the invention.

Throughout the specification and unless explicitly stated otherwise, the term “value” means credits, gaming tokens, coins, paper, currency, tickets, vouchers, credit cards, debit cards, smart cards, memory devices capable of storing value and any other object representative of value.

Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

Furthermore, as used herein and unless otherwise specified, the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

DETAILED DESCRIPTION OF VARIOUS EMBODIMENTS

Figure 1:
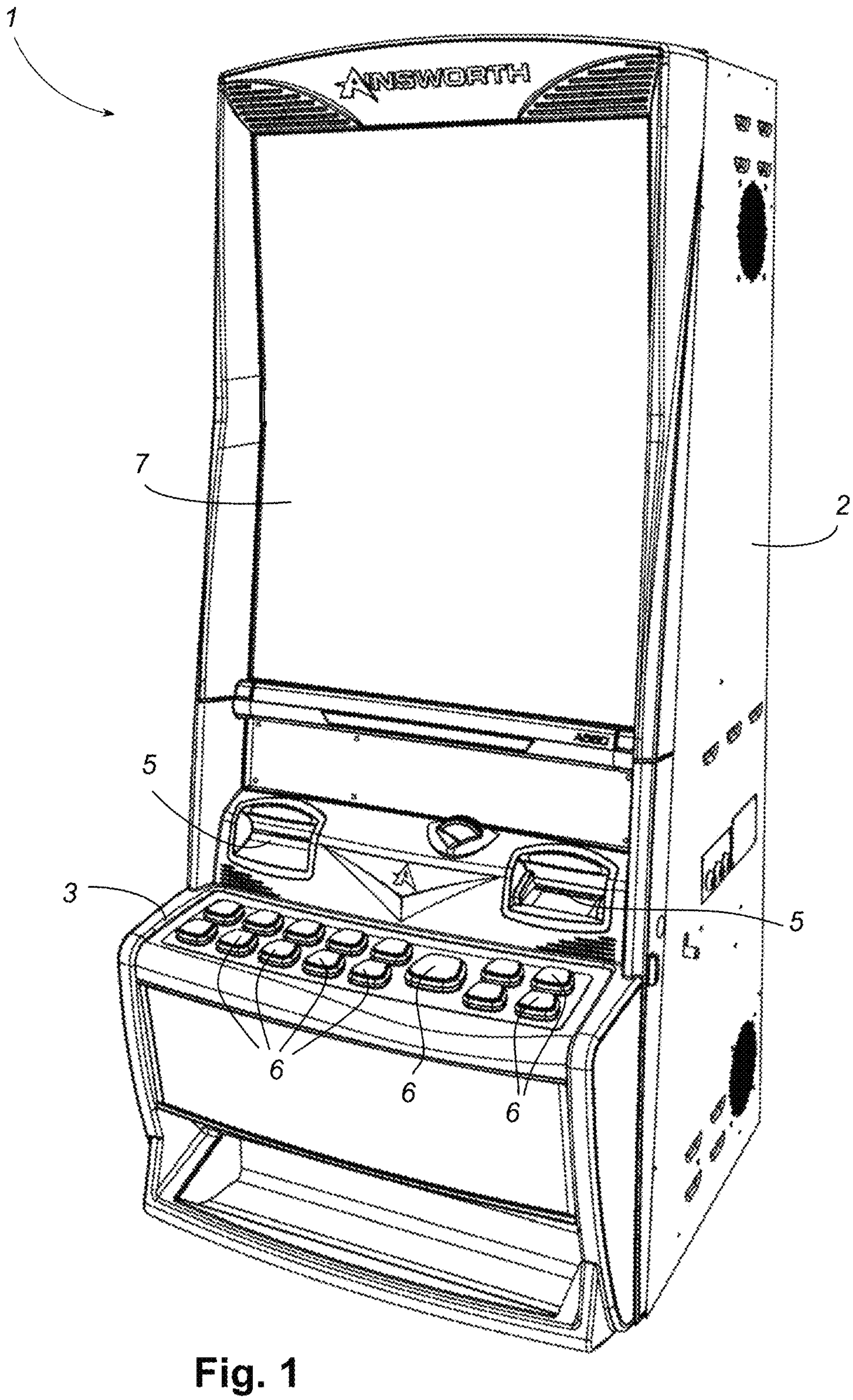
FIG. 1 is a perspective view of a gaming machine according to a first embodiment of the invention.

The present invention will now be described with reference to the following examples which should be considered in all respects as illustrative and non-restrictive. In the Figures, corresponding features within the same embodiment or common to different embodiments have been given the same reference numerals.

Referring to FIG. 1, a gaming machine 1 according to a first embodiment of the invention includes a cabinet 2, a console 3 and an internal game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the gaming machine 1. Other forms of value include gaming tokens, paper, tickets, vouchers, and any other object representative of value.

Figure 2:
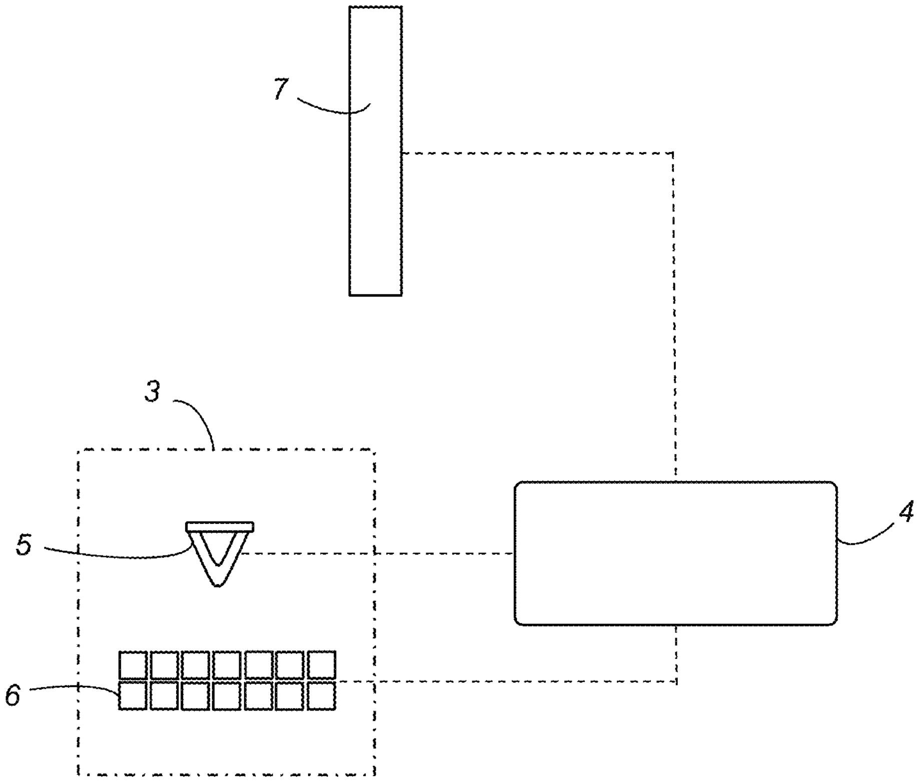
FIG. 2 is a schematic drawing of a game controller for the gaming machine of FIG. 1.

The game controller 4 is generally in the form of an electronic game controller comprising a central processing unit, such as a computer, and is in electronic communication with a display in the form of a video display screen 7, as well as various input devices on the console 3, as best shown in FIG. 2. Typically, the electronic game controller 4 also comprises a random access memory (RAM) associated with the central processing unit, the RAM being used to store programme instructions and transient data related to the operation of the electronic game controller and hence the gaming machine 1. The RAM contains a body of program instructions for implementing a game on the gaming machine 1, as discussed in more detail below. The central processing unit or processor may also be operatively associated with a further storage device, such as a hard disk drive, which is used for long-term storage of program components and data relating to the electronic game controller 4 and/or the gaming machine 1, including a database for game performance data, as well as information gathered from users. It is also appreciated that a person skilled in the art would readily understand the location and use of the electronic game controller 4 in the gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the gaming machine 1. If not, the electronic game controller 4 will send a signal to the display 7 to show a message requesting further value to be added to the gaming machine 1.

Figure 3:
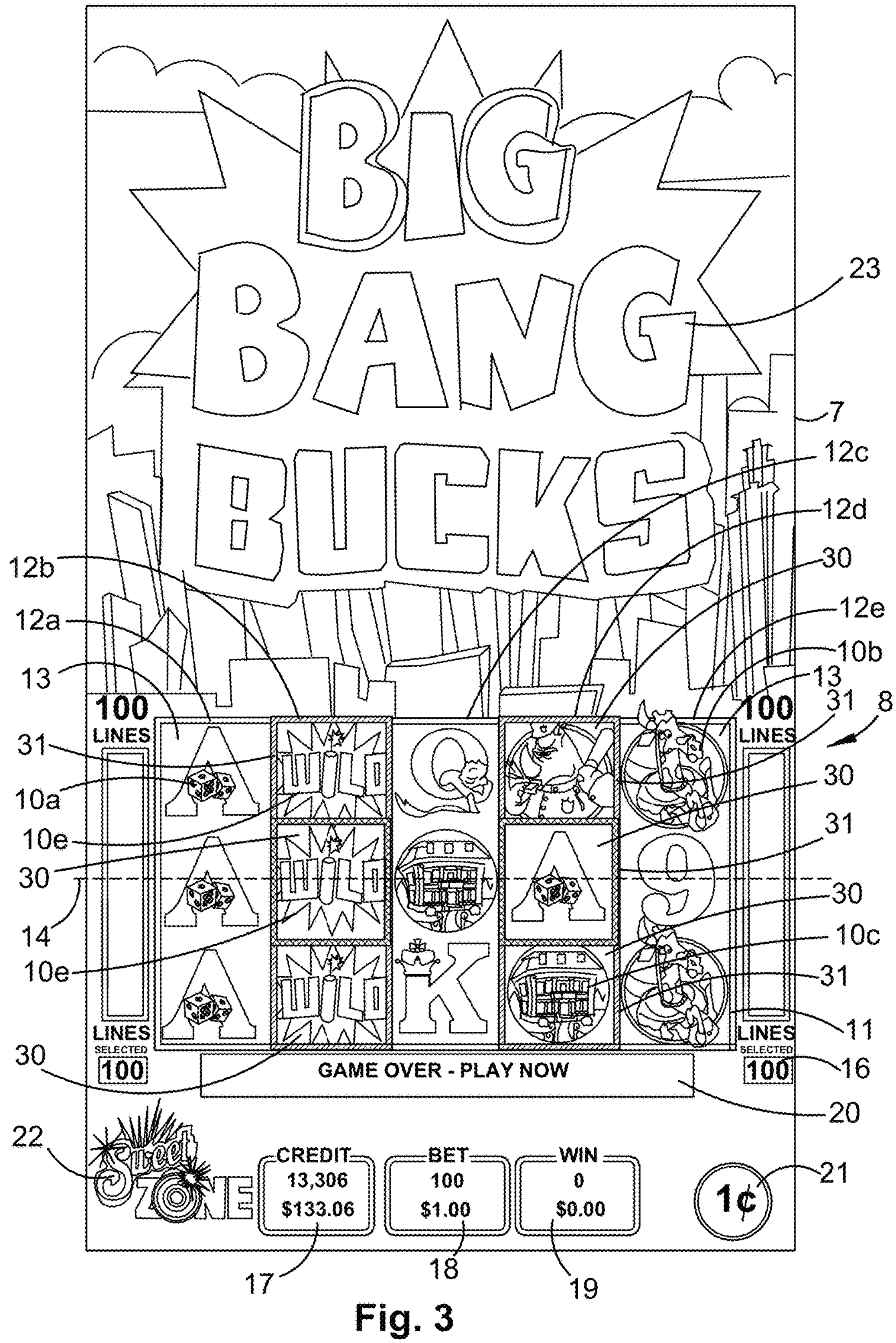
FIGS. 3 to 7 are front views of the display of the gaming machine of FIG. 1 illustrating a base game.
Figure 8:
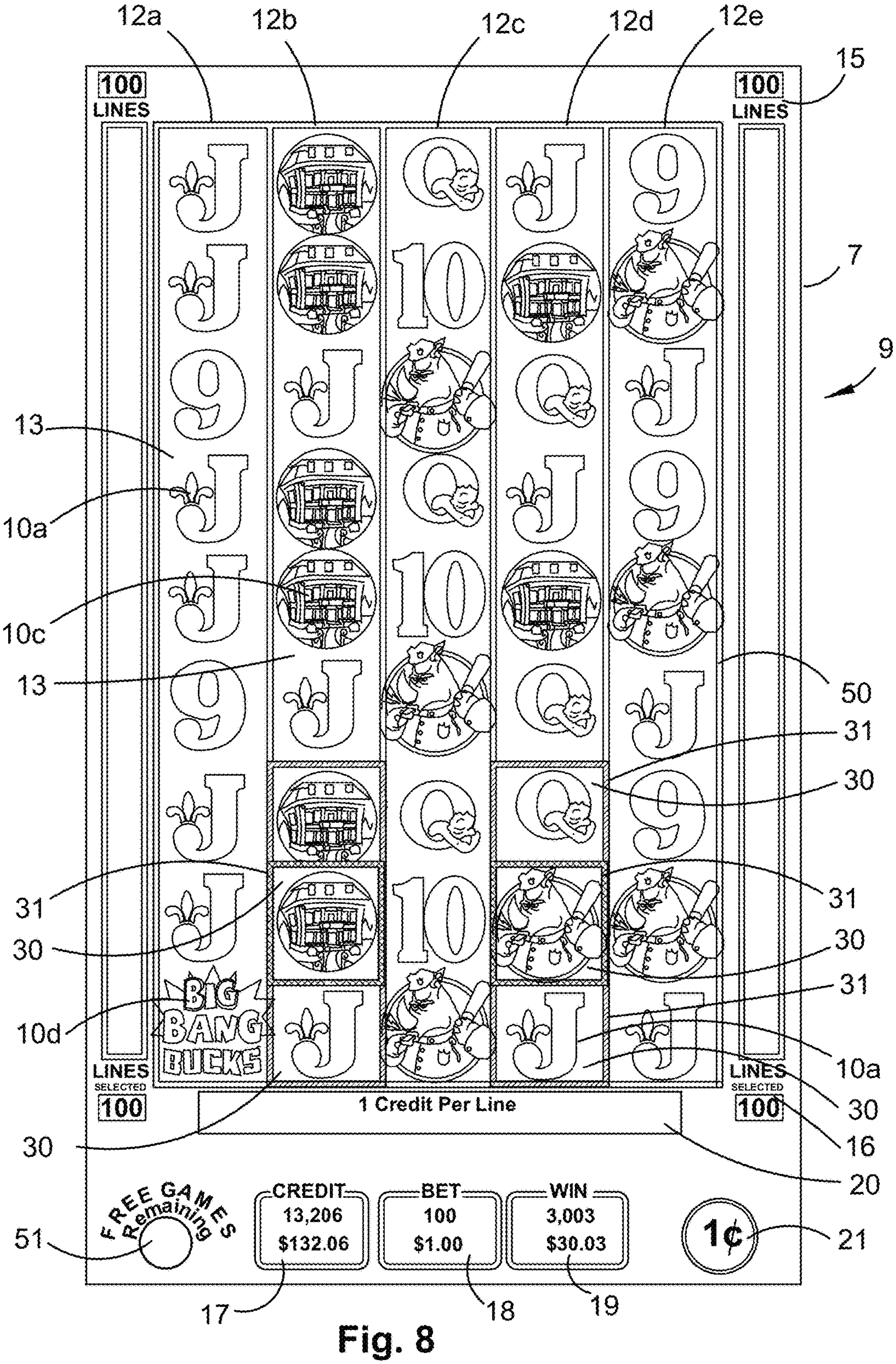
FIGS. 8 to 10 are front views of the display of the gaming machine of FIG. 1 illustrating a feature game.

The electronic game controller 4 is programmed to provide a game in the form of a base game 8 on a lower playing area 7*a* (as best shown in FIG. 3) and a feature game 9 (as best shown in FIG. 8) of the display 7 of the gaming machine 1 for play by a player. The base game 8 has game symbols 10 arranged into an array 11 in the form of five columns or "reels" 12. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7*a,* including showing the game symbols 10, array 11 and other visible elements of the games.

The array 11 of the base game 8 defines predetermined game or symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

The array 11 is arranged so that a player can select one or more predetermined "pay lines" 14 defined around the array, which correspond to combinations of the symbol or game positions 13. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols to trigger the feature game 9. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10*a*, animal-themed symbols 10*b*, item-themed symbols 10*c*, scatter symbols in the form of "BIG BANG BUCKS" symbols 10*d* and a substitute or wild card symbol in the form of "WILD" symbols 10*e*. The electronic game controller 4 randomly determines the appearance of the game symbols 10 on the array 11.

The video screen 7 also displays other standard game information including the number of pay lines available 15, the number of player-selected pay lines 16, the amount of player credits 17, the amount of the current bet wagered by the player 18, the amount of wins by the player 19, a message area 20, a current denomination button 21 indicating the currently selected base bet denomination and the name 22 of the brand or type of game that the base game 8 belongs to, being "Sweet Zone"™. The video screen 7 displays the name 23 of the base game 8, "Big Bang Bucks"™, as best shown in FIGS. 3 to 7. In other embodiments, the video screen 7 displays a menu button for bringing up a menu screen (typically explaining the game rules and showing the available pay lines 14) and/or jackpot information relating to the based game 8 and feature game 9 that are awarded by the electronic gaming machine 1. This jackpot information can comprise, in descending order of monetary value, a grand jackpot, major jackpot, minor jackpot and mini jackpot.

The electronic game controller 4 designates special game positions 30 on the array 11 that are each visually indicated to the player during play of the base game 8 by a graphical element 31. In this embodiment, there are six special game positions 30 in the base game 8 that occupy reels 12*b* and 12*d* (typically called reels 2 and 4). The graphical element 31 is graphically enhanced to ensure that the player can distinguish the special game positions 30 from the other game positions 13 in the array 11 during game play. In this embodiment, the graphical element 31 takes the form of a highlighted boundary that surrounds each special game position 30.

Each boundary 31 has a distinct colour that distinguishes the special game positions 30 from the other game positions 13 in the array 11. Generally, the top and bottom special game positions 30 of each reel 12*b*, 12*d* have a blue boundary 31 and the middle special game position 30 of each reel 12*b*, 12*d* has a red boundary 31. It is preferred that adjoining special game positions 30 alternate in colour to assist in distinguishing the special game positions from each other. Also, each boundary 31 is animated by having a flashing chaser light move along the boundary during game play to further highlight the special game positions 30 visually to the player. Thus, the player is able to discern the special game positions 30 conveniently and without difficulty during game play and thus is able to be look out for special symbols appearing in the special game positions 30.

Figure 4:
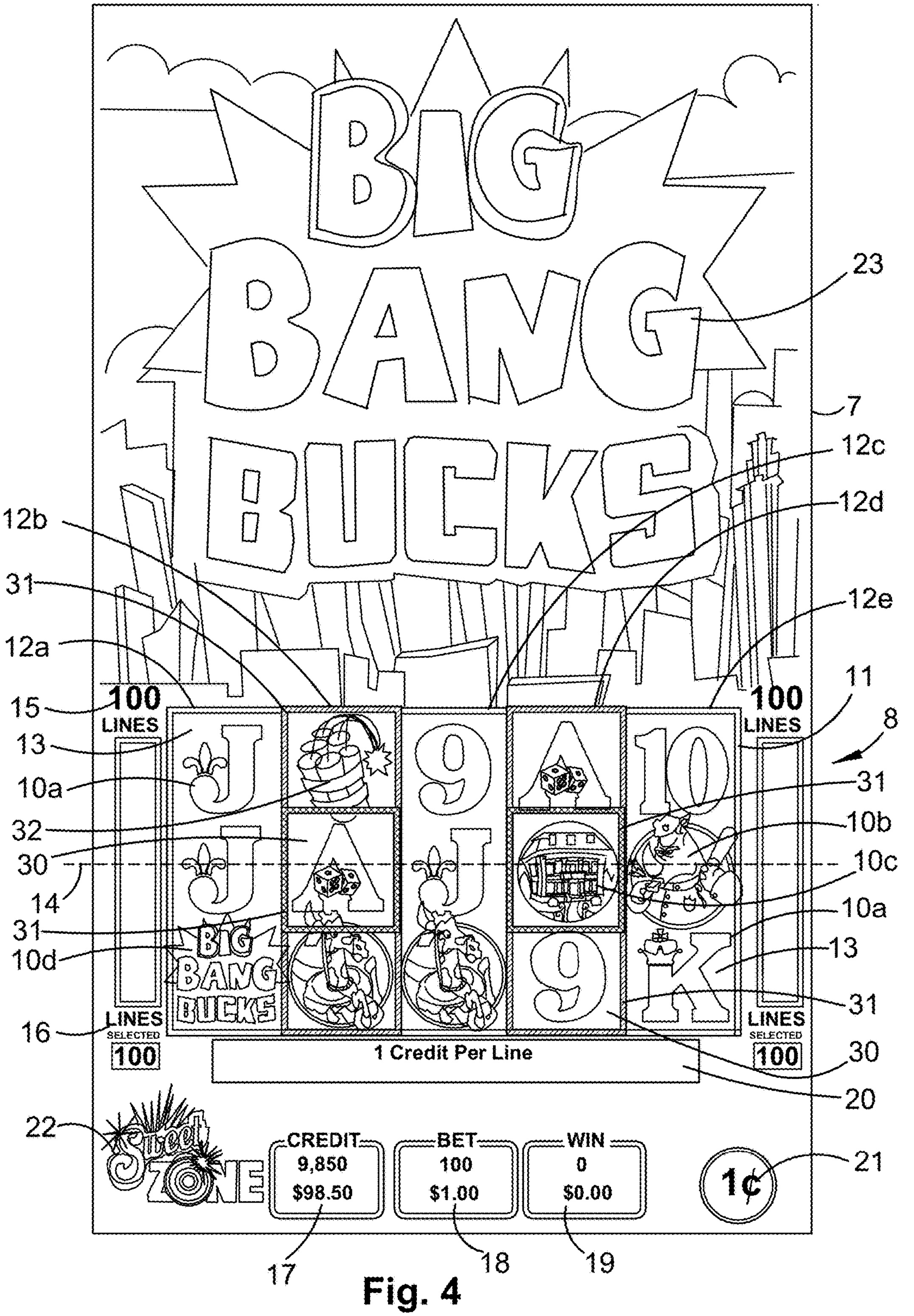
Figure 5:
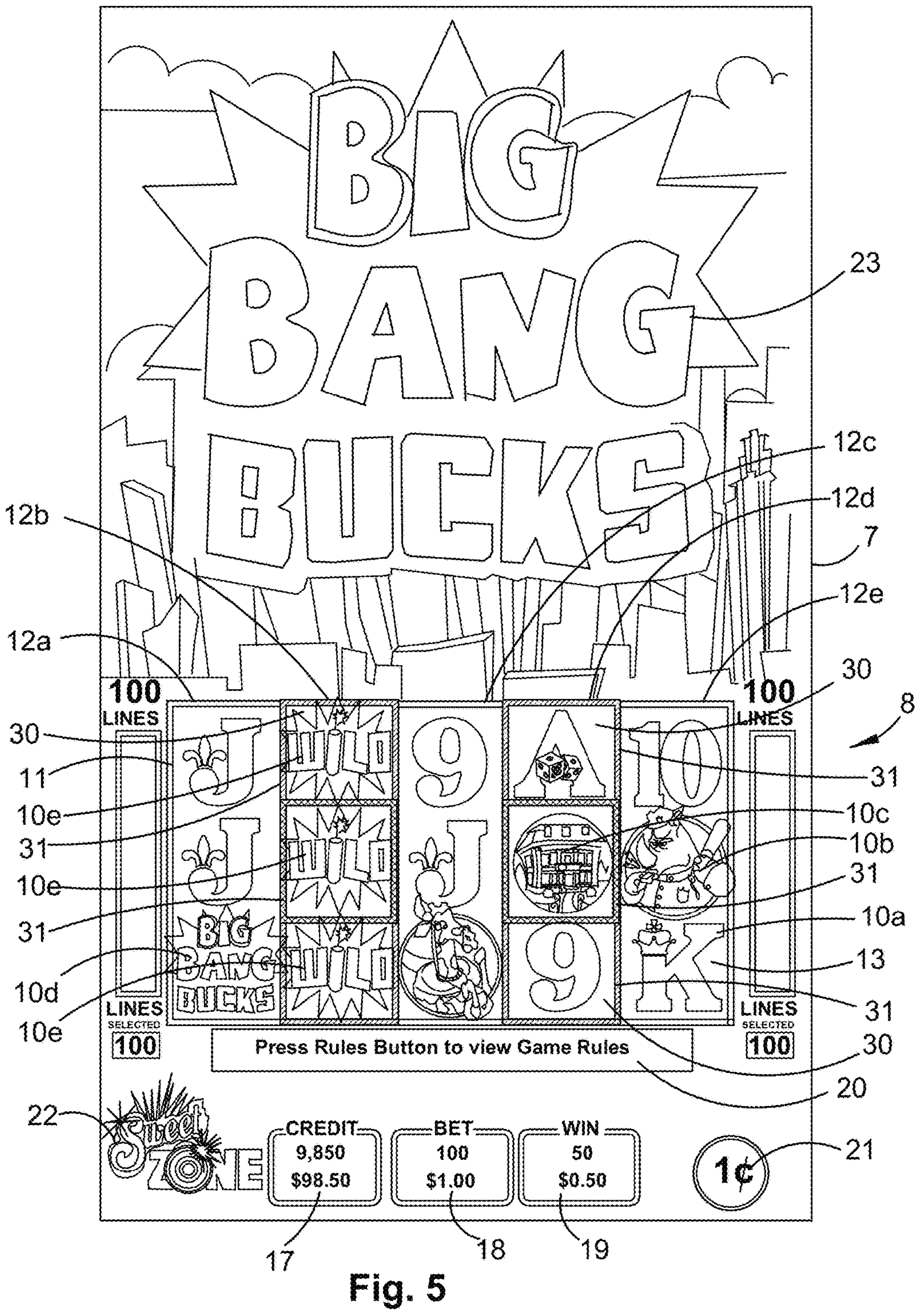
Figure 6:
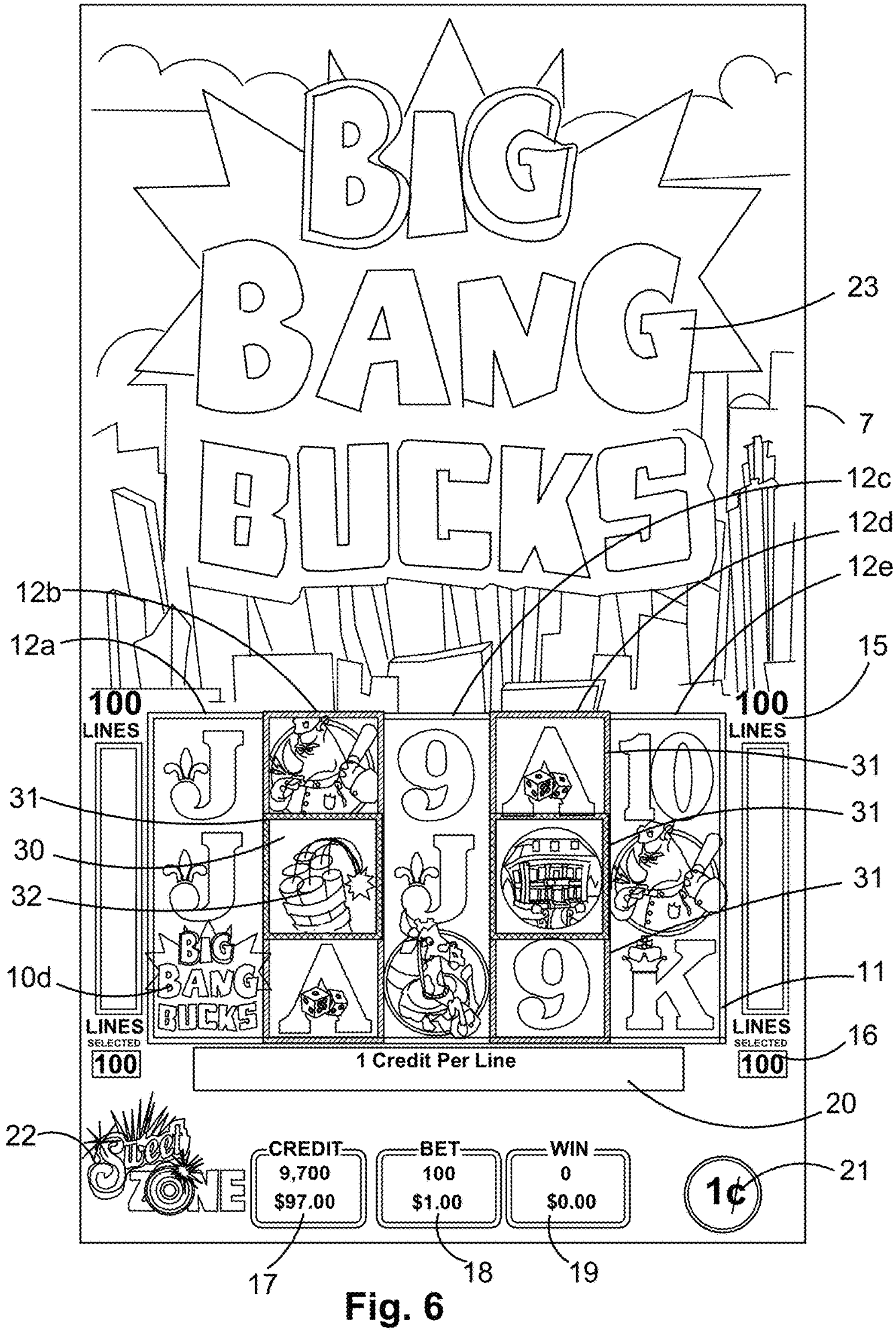
Figure 7:
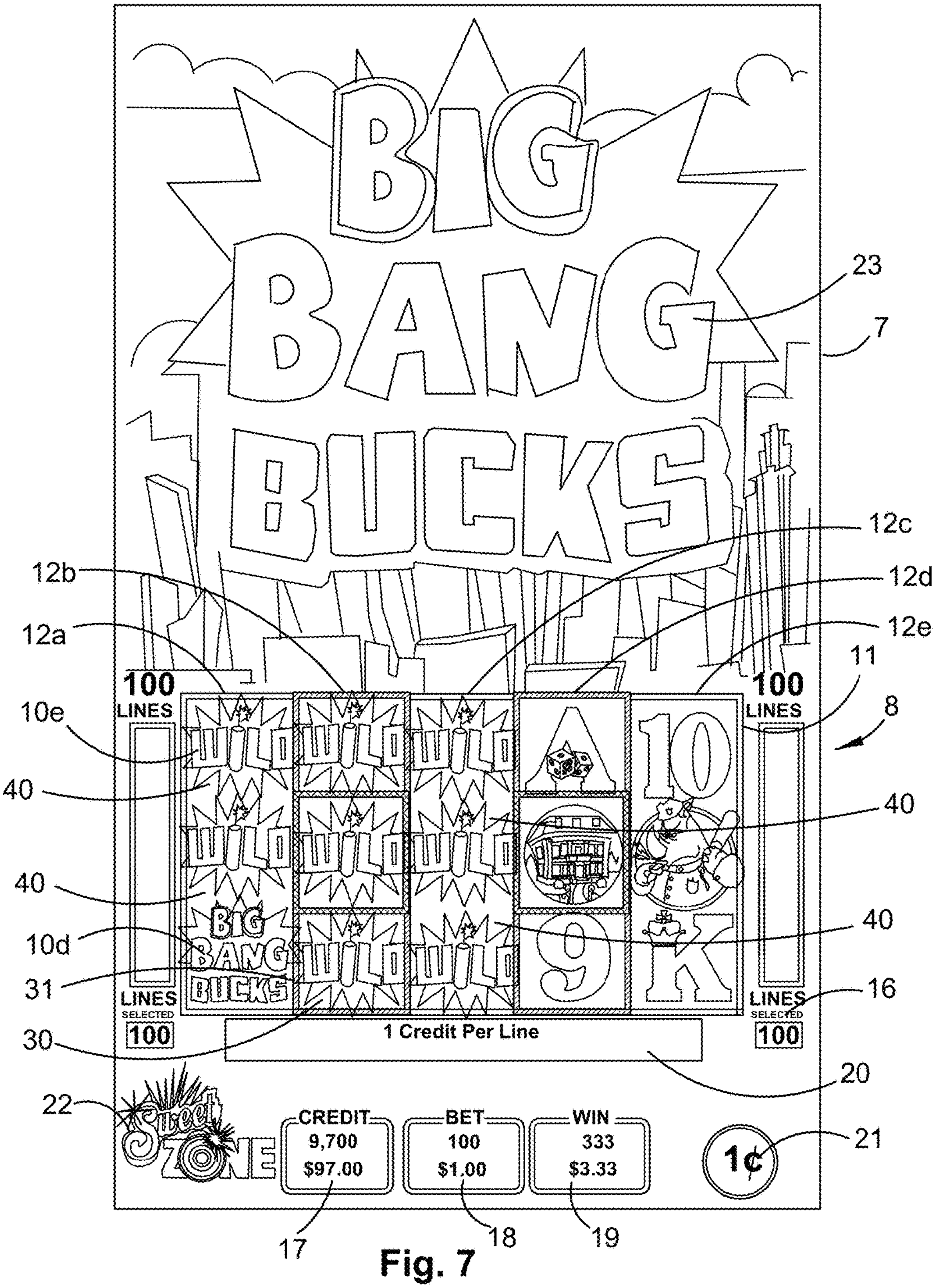

The electronic game controller 4 randomly displays game symbols 10 in the game positions 13 and the special game positions 30 as indicated by the boundary 31. Where a special symbol in the form of dynamite symbol 32 appears in one of the special game positions 30, this causes the electronic game controller 4 to award a game enhancing element to the player. In this embodiment, there are two game enhancing elements that are awarded, depending on whether the dynamite symbol 32 has appeared in a blue special game position 30 or a red special game position 30. If the dynamite symbol 32 appears in one of the blue game positions 30 (i.e. the top or bottom special game position 30 in either reel 12*b* or 12*d*), then the game enhancing element is a change or transformation of each of the game symbols 10 in all the special game positions 30 to another game symbol for the reel 12*b* in which the dynamite symbol 32 has appeared, as best shown in FIGS. 4 and 5. If the dynamite symbol 32 appears in one of the red game positions 30 (i.e. the middle special game position 30 in either reel 12*b* or 12*d*), then the game enhancing element is a selection of a group of "resultant" game positions 40 in which the game symbols 10 in those resultant game positions change or transform into another game symbol, as best shown in FIGS. 6 and 7. As best shown in FIG. 7, in this embodiment the resultant game positions 40 comprise all the special game positions 30 for the reel 12*b* in which the dynamite symbol 32 appeared and all the game positions 13 in the reels 12*a*, 12*c* on either side of the reel 12*b*. In either game enhancing element, the game symbol 10 in each special game position 30 or resultant game position 40 changes or transforms into the substitute WILD symbol 10*e*.

In the base game 8, the player initially makes a bet using vending slots 5 to initiate play of the gaming machine 1 by building up credit to play the base game 8 on the gaming machine. For example, the player can bet or wager monetary amounts equivalent to a particular amount of credits, depending on the bet denomination selected for the base game. Also, the player can make any additional side bets or ante-bets during play of the base game 8 once the base game has commenced to access additional features in the base game, such as increasing the number of winning combinations in the base game.

Typically, gaming machines offer a number of preset bet options that the player can make, and these bet options can vary depending on the game or games offered on the gaming machine. For example, a game on a gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

The gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the gaming machine has not yet been played or has been started up, the default bet denomination is initially selected by the electronic game controller 4. The default bet denomination can be randomly selected or chosen according to a predetermined order. Usually, the electronic game controller 4 will select the bet denomination with the lowest value that is available for the base game 8, which would be the 1¢ bet denomination for this embodiment. The player may change the bet denomination at any time in the base game 8 by touching the denomination button 21 before or after the reels 12 have spun. In this embodiment, touching the denomination button will bring denomination images that the player may select to quickly change the bet denomination between plays of the game 8.

Once the player has commenced play of the game 8 by making an appropriate bet via the vending slots 5, the electronic game controller 4 then commences a play of the base game 8 by sending a signal to the display 7 to cause the reels 12 to appear to visibly rotate or "spin" in a linear path, typically in a downward vertical direction, and randomly display the game symbols 10 in each game position 13 (including the special game positions 30) for each play of the array 11 for the base game 8. After the reels 12 stop spinning (and thus ends the spin or play of the base game 8), the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination.

The electronic game controller 4 will also determine whether the special dynamite symbol 32 has appeared in any of the special game positions 30. It is also noted that the special game positions 30 are visually indicated or marked by the boundaries 31 for the entire play from when the reels 12 start spinning to when the reels 12 stop spinning and display game symbols 10. If the dynamite symbol 32 appears in one of the other game positions 13, then this does not cause the award of either game enhancing element. As best shown in FIG. 4, the dynamite symbol 32 has appeared in the top blue special game position 30 of reel 12*b*, causing the electronic game controller 4 to award the game enhancing element. In this case, the game enhancing element comprises changing or transforming the game symbols 10 (including the dynamite symbol 32) in the resultant game positions 40 (being the special game positions 30 of reel 12*b*) into substitute WILD symbols 10*d*, as best shown in FIG. 5. This transformation of game symbols 10 into WILD symbols 10*d* increases the chances of the player obtaining a winning combination of game symbols for the player-selected pay lines 14.

Likewise, as best shown in FIG. 6, the dynamite symbol 32 has appeared in the middle red special game position 30 of reel 12*b*, causing the electronic game controller 4 to award the game enhancing element. In this case, the game enhancing element comprises changing or transforming the game symbols 10 (including the dynamite symbol 32) in the resultant game positions 40 (being the special game positions 30 of reel 12*b* and the game positions 13 of the adjoining reels 12*a*, 12*c* on either side of reel 12*b*) into substitute WILD symbols 10*d*, as best shown in FIG. 7. This transformation of game symbols 10 into WILD symbols 10*d* significantly increases the chances of the player obtaining a winning combination of game symbols for the player-selected pay lines 14.

The award of the game enhancing elements also occurs where the dynamite symbol 32 appears in either the blue or red special game positions 30 of the reel 12*d* with similar effect. However, the resultant game positions 40 are different for the special game positions 30 in the reel 12*d*. The dynamite symbol 32 in the top or bottom blue special game positions 30 of reel 12*d* will result in the game symbols 10 in the resultant game positions 40 (being the special game positions 30 of reel 12*d*) to change or transform into WILD symbols 10*e*. The dynamite symbol 32 in the middle red special game position 30 of reel 12*d* will result in the game symbols 10 in the resultant game positions 40 (being the special game positions 30 of reel 12*d* and game positions 13 of adjoining reels 12*c*, 12*e* on either side) to change or transform into WILD symbols 10*e*.

The electronic game controller 4 also determines whether the feature game 9 should be activated, based on a predetermined trigger event, such as the appearance of a number of trigger symbols appearing in a play or spin of the base game 8. In this embodiment, the trigger event is the appearance of three scatter symbols, being the BIG BANG BUCKS symbols 10*d*. The BIG BANG BUCKS symbols 10*d* need not appear on the same pay line 14, but can appear on any of the player-selected pay lines.

Figure 9:
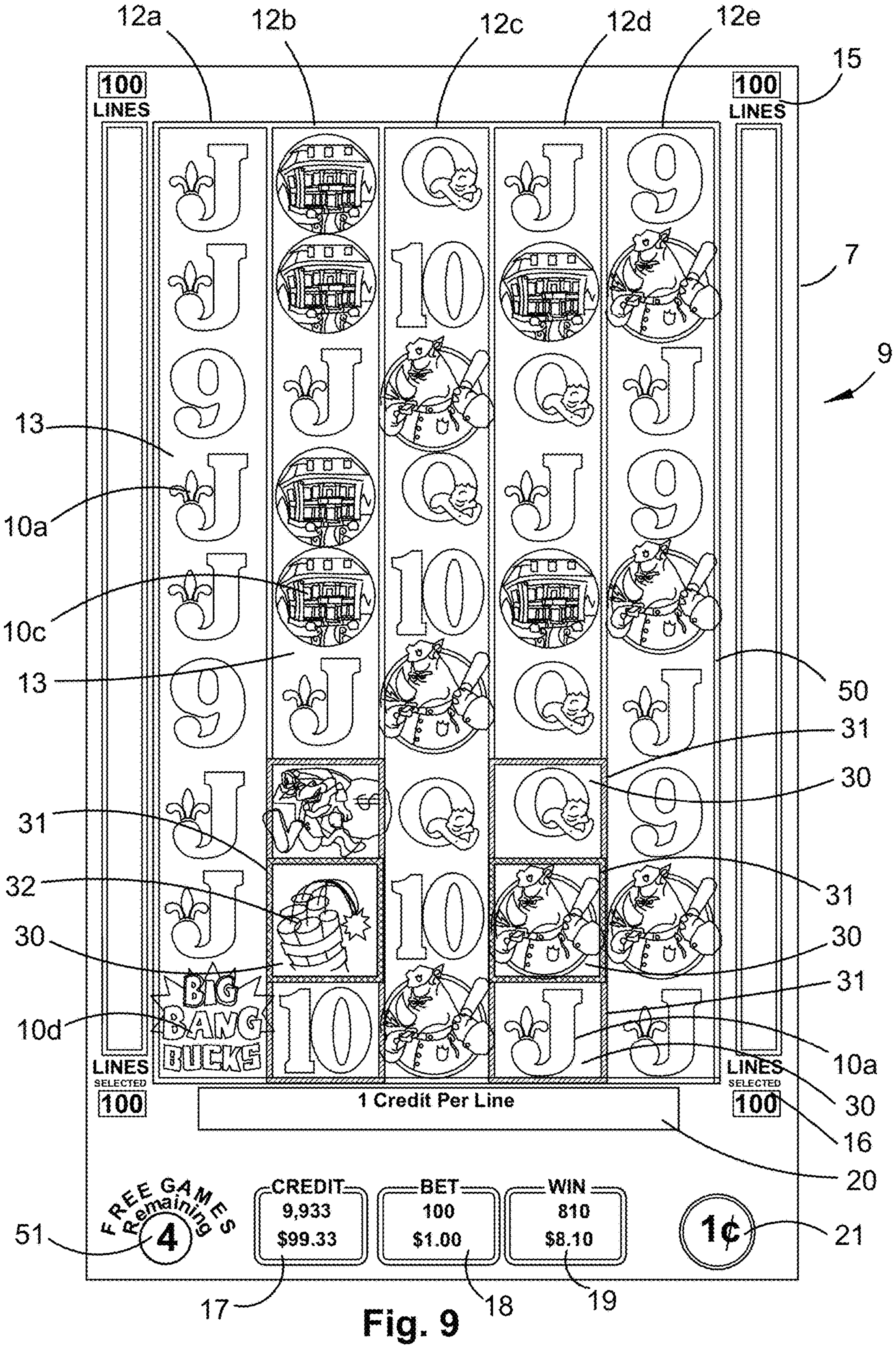
Figure 10:
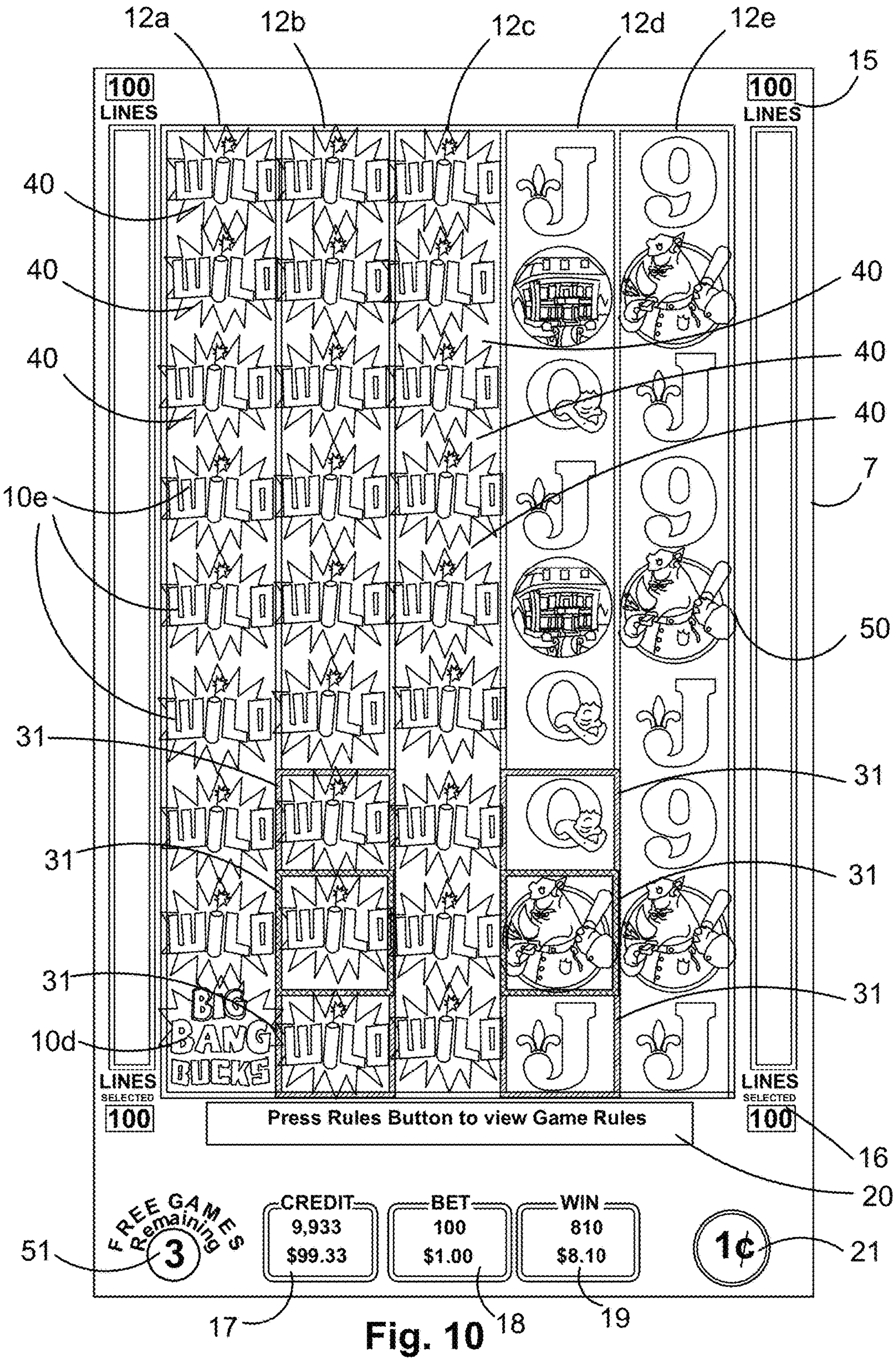

In response to the trigger event, the electronic game controller 4 then transmits a signal to the video screen 7 to cause the feature game 9 to appear on the video screen 7, as best shown in FIGS. 8 to 10 where corresponding features have been given the same reference numerals. In this embodiment, the feature game 9 comprises an array 50 of nine rows and five columns representing a 9×5 array that fills the entire video screen 7, as best shown in FIG. 8. The array 50 appears as an extension of the 5×3 base game array 11. In other words, when the feature game 9 is triggered, the additional rows rise up from the base game array 11 to create the feature game array 50. Alternatively, the feature game array 50 replaces the base game array 11.

The feature game 9 uses the same game symbols 10 as the base game 8, as well as the same array 11, reels 12, game positions 13 and player-selectable pay lines 14 on the video screen 7. In the feature game 9, ten free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game 9. In addition, it will be appreciated that in the art free spins are commonly referred to as "free games". The number of free games remaining in the feature game 9 is indicated by a counter 51. Typically, the prizes awarded for the same winning combinations of game symbols in the feature game 9 are of higher value than the prizes awarded in the base game 8.

The feature game 9 operates in a similar manner to the base game 8, where the reels 12 visibly rotate and display randomly selected game symbols 10 in each game position 13, including the special game positions 30, as best shown in FIG. 8. The special game positions 30 are visually indicated or marked by their respective boundaries 31 from the start to the end of each play of the feature game 9, the same as in the base game 8. Predetermined winning combinations of randomly selected game symbols 10 in the array 50 of the feature game 9 also result in the award of prizes to the player, usually of an enhanced value compared to the prizes awarded in the base game 8.

The special game positions 30 in reels 12*b*, 12*d* do not change in the feature game array 50 in that they do not extend upward with the additional rows but remain the same as in the base game array 11. The special game positions 30, special dynamite symbols 32 and awarding of the game enhancing elements work in the substantially same manner in the feature game 9 as described in relation to the base game 8. In this case, the game enhancing elements are applied to all the game positions 13 in the extended reels 12*a* to 12*e*. For example, where a dynamite symbol 32 appears in the middle red game position 30 of the reel 12*b* (as best shown in FIG. 9), the electronic game controller 4 selects the group of resultant game positions 40 based on the same criteria of all the game positions in the reel 12*b* and all the game positions in the adjoining reels 12*a*, 12*c* on either side. This has the effect in the feature game 9 of selecting all the game positions 13 in each extended reel 12*a*, 12*b*, 12*c*, including the special game positions 30, as the resultant game positions 40 in which the game symbols 10 change into the substitute WILD symbol 10*e*, as best shown in FIG. 10.

In other preferred forms, the graphical element comprises an area on the array 11, 50 associated with each special game position 30 that changes to indicate the appearance of the dynamite special symbol 32 in the special game position. For example, message boxes (not shown) can appear adjacent the array 11, 50 and linked to the special game positions 30 that are initially blank and then advise the player when the dynamite special symbol 32 appears in the associated special game position 30. Also, there can be a common message box for all the special game positions 30 and the message advising the player which special game position has the dynamite special symbol 32.

In another preferred form, special game position 30 may be animated in other ways other than animating the boundary 31. For example, the special game position 30 could rotate about the dynamite special symbol 32. Alternatively, the boundary 31 can be animated differently to having a chaser light move along its perimeter. For example, the boundary 31 could be animated to show it is electrified to visually highlight and indicate its presence on the array 11, 50.

In yet another preferred form, the dynamite special symbol 32 is animated when it appears in the special game position 30 to visually indicate its appearance to the player. For example, the dynamite special symbol 32 may be static in game positions 13 but in the special game position 30, the fuse of the dynamite special symbol 32 may visually burn down to the dynamite and then explode to introduce the award of the game enhancing element.

While the embodiments of the invention have been described as using a change or transformation of game symbols into substitute symbols as the game enhancing elements, it will be appreciated that other game enhancing elements can be awarded instead or in conjunction with the transformation game enhancing element. For example, game enhancing symbols such as "Held Reels", "×10 Multiplier" (applicable to the prize awarded by the base game for the five of a kind trigger combination and/or to the total amount of the bet or credits bet per pay line), "10 Free Spins/Games", progressive symbols, fixed monetary prizes and changing the function of a standard game symbol 10*a*, 10*b*, 10*c* into a substitute symbol in addition to any displayed WILD substitute symbols 10*e*. Held columns or reels typically involve the column or reel to only display wild/substitute symbols, thus enhancing the probability of achieving a predetermined combination. Progressive symbols award a prize is awarded upon a certain number of progressive symbols are accumulated by the player over a number of games played on the gaming machine. Other examples include:

i) 15 Free Games;
ii) 10 Free Games;
iii) 8 Free Games;
iv) Bonus Prize of 5×bet (the total amount of the bet or credits bet per pay line);
v) Bonus Prize of 10×bet (the total amount of the bet or credits bet per pay line);
vi) Bonus Prize of 25×bet (the total amount of the bet or credits bet per pay line);
vii) Jackpot symbols for awarding monetary jackpots, including progressive jackpots, associated with the base game, feature game and/or the electronic gaming machine 1 independently of the game being played;
viii) All royal card symbols change to substitute symbols on reels 2, 3 and 4;
ix) All picture symbols 10*b* change to wilds on reels 2, 3 and 4, and
x) All symbols change to wild symbols on reels 1 and 5.

Additional examples of game enhancing elements include the game enhancing element comprises at least one or more a win multiplier, wild multipliers, bonus wilds, symbols that cause the award of additional free games, trigger symbols to retrigger the at least two second arrays, held columns, random wild symbols, stacked symbols, bonus symbols, new game symbols, reveal symbols, progressives, bonus credits, jackpot symbols, and one or more symbol replacements. A variety of game enhancing elements can be awarded by the game enhancing symbols, including:

- symbols that award a predetermined number of free plays of the game;
- win multiplier symbols that multiply the amount of any win from one of the predetermined winning combinations;
- "wild" symbols that cause the display of substitute symbols in randomly selected symbol positions;
- bonus symbols that awards a bonus prize, either as a monetary amount or as a bonus credit;
- wild multiplier symbols that cause the display of substitute symbols on the array 11 and multiplies the amount of any win from one of the predetermined winning combinations;
- bonus wild symbols that cause the display of substitute symbols on the array 11 and awards a bonus prize;
- symbols that cause the award of additional free plays of the game;
- symbols that cause one or more of the symbol positions to be held static (typically one or more reels 12*a* to 12*e*) and display substitute symbols on the array 11;
- symbols that cause the same game symbol to be stacked in a group of symbol positions, typically the group being one or more reels 12*a* to 12*e;*
- symbols that cause the display of new game symbols on the array 11;
- "reveal" symbols that cause a game symbol to reveal another game symbol; and
- "replacement" symbols that cause one or more game symbols to be replaced by other game symbols in the array 11.

These game enhancing symbols do not modify the function or value of the game symbols 10 that appear on the arrays 11, 50, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can takes effect with the next play of the game instead of applying to the result of the spun array 11, 50. In another preferred form, the game enhancing symbols may indicate the duration in which its game enhancing element is applied, such as a predetermined number of spins or a predetermined time period.

In other embodiments, the game enhancing symbols include "collector"-type game enhancing symbols which award points or tokens. The collection of points or tokens during the base game 8 and/or feature game 9 leads to the trigger of additional prizes or game enhancing symbols, depending on the number of points or tokens that are collected. These additional prizes can include stand alone progressive jackpots, bonus prizes and super games, which are enhanced versions of free spins or games where there are greater pay outs or frequency of wins.

It will be appreciated that in other embodiments, game enhancing elements can also be awarded as a separate aspect of the games 8 and 9 to the special game positions 30. In a further embodiment, the award of these additional game enhancing elements can be done by way of a sixth reel or the appearance of game enhancing symbols in the reels 12*a* to 12*e*.

In other preferred forms, the game enhancing element can be an enhanced version of the array 11, 50. The enhanced array may provide additional game enhancing symbols that include the award of points or an additional 5 free spins of the array 11, 50 (i.e. retriggering 5 more free spins). The collection of points awarded by the enhanced array during free spins or game leads to the trigger of additional prizes or game enhancing symbols, depending on the number of points that are collected. These additional prizes can include stand alone progressive jackpots, bonus prizes and super games, which are enhanced versions of free spins or games where there are greater pay outs or frequency of wins. In addition, the enhanced array has a different visual representation to the array 11, 50. In addition, the enhanced array may provide game enhancing symbols of greater value and/or frequency compared to the array 11, 50.

Where the game enhancing element comprises the award of a jackpot prize, it can take the form of a standalone progressive jackpot, fixed jackpot, mystery jackpot, symbol driven jackpot and any combination thereof (i.e. a mixture of different types of jackpots). In some embodiments, the jackpots are limited to the feature game 9. In other embodiments, the jackpots are shared by all the games 8 and 9. That is, the jackpots could be won through play of the games 8 and, 9.

A progressive jackpot prize takes a portion of each bet (typically a set percentage of each bet) made on the gaming machine and thus the amount of the progressive jackpot incrementally increases as more bets are made on the gaming machine 1. The progressive jackpot is typically awarded when a winning game combination associated with the jackpot occurs in the game played on the gaming machine. In many cases, progressive jackpots are associated with the least probable winning combination and are commonly the highest paying award of the gaming machine. In other cases, a separate trigger event can be used to award the progressive jackpot prize, such as a special jackpot symbol, a trigger event internally generated by the electronic game controller. Alternatively, or additionally, once a certain threshold is met, either a certain amount that has been bet on the gaming machine or the incremented amount of the progressive jackpot, a trigger event is activated in the electronic gaming machine to pay out the progressive jackpot prize. Progressive jackpot prizes also tend to be shared amongst multiple gaming machines so as to increase the amount of the progressive jackpot prize and hence increase player interest in playing one of the electronic gaming machines. In some gaming machines, more than one jackpot or progressive jackpot are offered by the gaming machine or gaming machines linked together.

The jackpot or bonus prizes may also be mystery jackpots rather than symbol driven jackpots. That is, none of the symbols in the game trigger the jackpot; hence the trigger event is a "mystery". By way of comparison, a standard jackpot is typically symbol driven in that a particular combination of symbols must occur in the game to trigger the standard jackpot.

The trigger event for the mystery jackpot can be one randomly generated by the electronic game controller 4 for each play of the games 8 and 9. One way to implement the random determination of the trigger event is for the electronic game controller 4 to internally generate a random number and check if it is a predetermined number or within a predetermined range of numbers that will initiate the appearance of the trigger symbols. For example, the predetermined range of numbers could be the range of numbers between 1 and 10 and the electronic game controller 4 internally generates a random number between 1 and 100. If the generated number is any one of numbers 1 to 10, then this results in the electronic game controller 4 causing the trigger event to occur and award the progressive jackpot prize. It will be appreciated that this manner of determining the trigger event may also be used to determine whether the feature game 9 is triggered in the base game 8.

Progressive jackpots can be confined to the gaming machine 1 as so called "standalone" progressive jackpots. Alternatively, the jackpot is a wide area or an in-house linked progressive jackpot prize. In other embodiments, one or more the progressive jackpot prizes are configured to be part of a wide area or in-house linked progressive jackpot prize. In other words, the progressive jackpot prizes can be awarded on a group of networked gaming machines in a specified area or a group of specified gaming machines that are linked together for jackpot purposes (usually via a central jackpot controller). The jackpot prizes can also be shared with any other games offered on the same gaming machine 1 (as in multi-game gaming machines).

During play of the games 8 and 9, the electronic game controller 4 will determine whether the trigger event for the jackpot has occurred. In response to the occurrence of the jackpot trigger event(s), the electronic game controller 4 transmits a signal to the video screen 7 to cause the jackpot (s) associated with the jackpot trigger event(s) to be awarded to the player. After the jackpot(s) are awarded, the amounts for any awarded jackpots are reset. The amounts of the jackpots that have been won can be reset either to a predetermined start amount or simply increment upwardly from zero where the won jackpot is a progressive jackpot.

In some embodiments, the in-game trigger event is determined at the end or during the play of the game; i.e. at the end or during a spin of the reels 12. In some embodiments, the in-game trigger event occurs in a preceding play of the game so that the result of the in-game trigger event takes place in a subsequent play of the game, typically the next play of the game after the preceding play but could include a later successive play of the game.

Although the preferred embodiments of the invention have been described as awarding two types of game enhancing elements in both the base game 8 and the feature game 9, it will be appreciated that the special game positions 30 can be configured to award any number or types of game enhancing elements. For example, the special game positions 30 may only award only one game enhancing element. In another example, each special game position 30 awards its own unique game enhancing element to create an additional variety in game play. In a further example, the special game positions 30 may award one type of game enhancing element in the base game 8 and then award a different game enhancing element in the feature game 9.

In one preferred form, the resultant game positions 40 are limited to one of the reels adjacent or adjoining the reel containing the dynamite special symbol 32 in the special game position 30. The resultant game positions 40 can also exclude the reel containing the dynamite special symbol 32 in the special game position 30.

Also, while in the embodiment, the same special game position 30 awards the same group of resultant game positions 40 in the base game 8 and the feature game 9, in another variation, the resultant game positions 40 vary between the base game 8 and the feature game 9 for the same special game position 30.

Furthermore, the embodiments of the invention have been described as providing a standard 5×3 array for the base game 8 and an enlarged 9×5 array for the feature game 9. However, it will be appreciated that in other embodiments, the size and shape of the base game array 11 and feature game 50 may vary as desired. For example, the arrays 11, 50 could take any number of different shapes, such as triangular, circular, square, hexagonal, hemi-spherical or other polygonal shapes. For example, the base game array 11 could comprise a circular array having three rings (equivalent to rows) like a bullseye target segmented into five columns. The feature game array 50 would then expand into additional rings surrounding the initial rings of the base game array 11. Alternatively, the arrays 11, 50 could have an unequal number of rows or columns. For example, the reels 12*a*, 12*b* could have three rows, but the reels 12*c* to 12*e* could have four rows.

While the preferred embodiment of the invention has been described in relation to both a base game 8 and a feature game 9, those skilled in the art will appreciate that the use of special game positions 30, special symbols 32 and awarding game enhancing elements can readily be applied to the base game alone or a feature game alone.

In a further embodiment, the location of the special game positions 30 change between the base game 8 and the feature game 9. For example, the special game positions 30 can be located in reels 12*a* and 12*c* in the base game 8, and then move to reels 12*b* and 12*d* in the feature game 9. Also, the special game positions 30 may change between plays of the game (either the base game 8 or the feature game 9). This can be either successively or after a predetermined number of plays in one location, the special game position 30 moves to another location on the array 11, 50.

Another preferred form involves scattering the location of the special game positions 30 in the array 11, 50 instead of being grouped together in a particular reel 12. For example, instead of having special game positions 30 in reels 12*b*, 12*d*, the six special game positions 30 can be placed so that there is at least one special game position in each reel 12*a* to 12*e* of the array 11, 50. In yet another preferred form, additional special game positions 30 are provided in the feature game array 50. For example, another set of special game positions 30 can be located in reel 12*c* in addition to reels 12*b*, 12*d* in the feature game array 50.

In yet another preferred form, the boundaries 31 may only appear on their respective special game positions 30 once a play of the base game 8 commences and remain on display until the end of that play. Alternatively, the boundaries 31 are permanently displayed on their respective special game positions 30 at all times on the video screen 7.

Referring to FIGS. 11 to 19, another embodiment of the invention is shown schematically, so that extraneous features have been removed for the purposes of clarity. In this embodiment, the game enhancing element comprises a variable bonus prize randomly determined by the electronic game controller 4 and displayed in association with the designated special game position 30. Hence, in this embodiment, the player is immediately able to see what additional bonus prize can be won if the special symbol 32 appears in the special game position.

Figure 11:
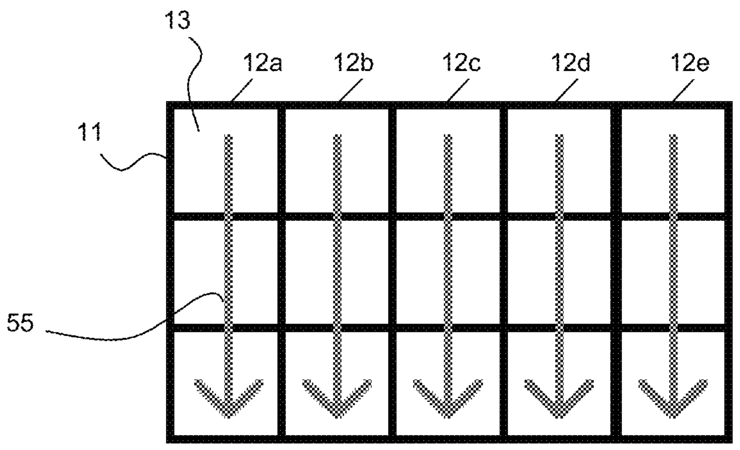
FIGS. 11 to 19 are schematic drawings illustrating another embodiment of the invention; partial simulated screen shot illustrating the game of FIG. 7.

In FIG. 11, a play or spin of the base game 8 is taking place on a 5×3 array 11. The game or symbol positions 13 are grouped to form five reels 12*a* to 12*e*, where the same reel strip is used to randomly select and display game symbols of each reel 12*a* to 12*e*. As shown by arrows 55, the reels 12*a* to 12*e* are spinning and will eventually stop to display game symbols 10 and/or special symbol 32 in the symbol positions 13.

The electronic game controller 4 then accesses a table or list 60 of patterns 62 in the form of a strip 65. The electronic game controller 4 randomly selects one of the patterns 62 from the list 60 to determine which of the game positions are to be designated as special game positions 30. In this embodiment, only three game positions are designated as special game positions 30 and each pattern 62 in the pattern list 60 indicates which three game positions are designated. For example, pattern 62*a* (called pattern 1 on the list 60) may require the middle game position 13 of reel 12*a*, the top game position 13 of reel 12*b* and the bottom game position 13 of reel 12*e*. In another example, pattern 62*b* (called pattern 2 on the list 60) may require the top game position 13 of reel 12*b*, the bottom game position 13 of reel 12*c* and the middle game position 13 of reel 12*c*. In this way, unique patterns 62 are selected to designate and display the special game positions 30 on the array 11 of reels 12. In this embodiment, 35 patterns 62 are provided on the pattern list 60, but it will be appreciated that less or more patterns may be provided as required.

Once the pattern 62 is selected the electronic game controller 4 then accesses a prize table or list 70 of bonus prizes 72 in the form of a strip 77. The electronic game controller 4 randomly selects one of the bonus prizes 72 from the strip 75 to determine which bonus prize is to be associated with the designated special game positions 30. In this embodiment, the selection of a bonus prize 72 for a special game position 30 is independent of the selection of the other bonus prizes for the other special game positions 30. That is, the probability of a bonus prize 72 being selected is the same irrespective of any previous selection. Hence, the electronic game controller 4 may be able to select the same bonus prize for more than one special game position 30. For example, the electronic game controller 4 may randomly select the 250 credit bonus prize 72*a*, the Mini (jackpot) prize 72*b* and the “10 fs+wilds” (10 free spins with wild card symbols) prize 72*d*. The electronic game controller 4 can either randomly allocate the selected bonus prizes to the designated special game positions 13, allocate them in order of selection (i.e. the first randomly selected prize is allocated to the first selected designated game position and so on, or even in reverse order). However, it will be appreciated that in other embodiments the electronic game controller 4 selects a different bonus prize 72 for each special game position 30 so that there is a unique bonus prize relative to the other bonus prizes for each special game position 30.

Figure 13:
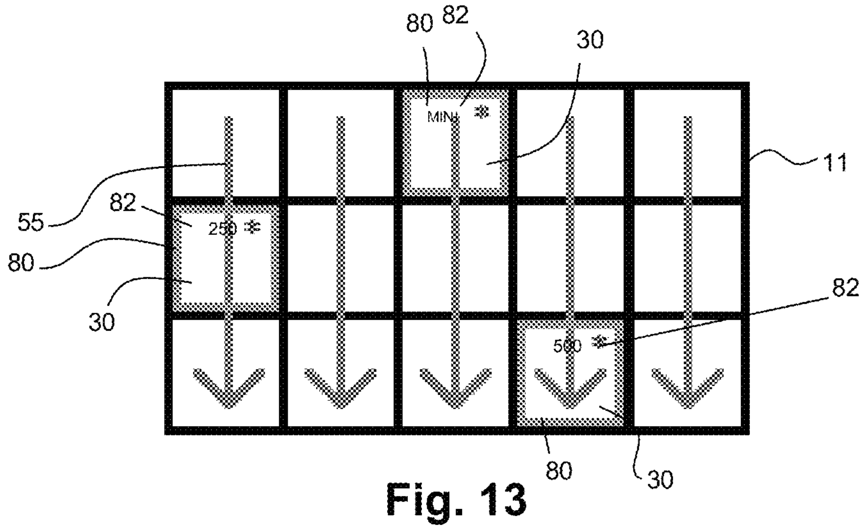

As best shown in FIG. 13, while the reels 12 are still spinning the special game positions 30 are designated and displayed to the player using an overlay image 80. In this case, the special game positions 30 are located in the middle game position 13 of reel 12*a,* the top game position 13 of reel 12*c* and the bottom game position 13 of reel 12*d.* In addition, a bonus prize symbol 82 is shown in the special game positions 30 to show the player what bonus prize can be won if the special symbol 32 appears in the special game position. The bonus prize symbol 82 is typically a contraction or abbreviation of the selected bonus prize 72 from the prize list 70. However, the bonus prize symbol 32 could be the same as the randomly selected bonus prize 72, such as "250 credits" or "Minor jackpot". It is preferred that a bonus symbol 82 is used to save space for display of the game symbol 10 or special symbol 32 that will appear in the special game position 30.

Figure 14:
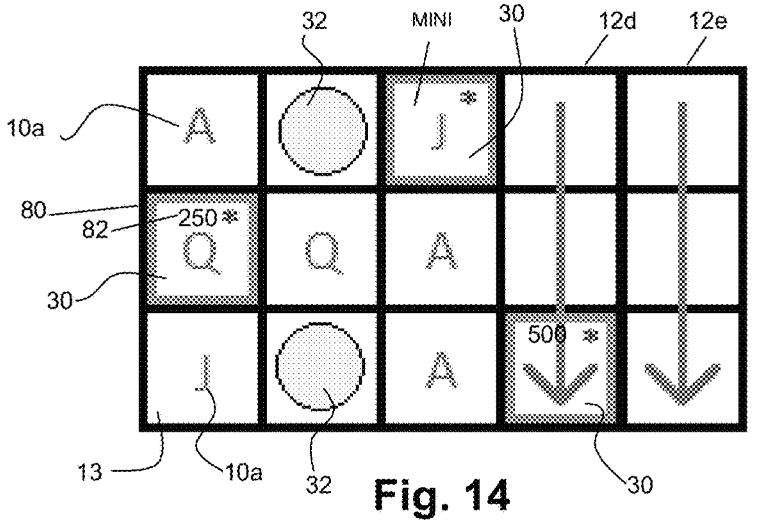

As shown in FIG. 14, the reels 12 spin at different rates so that some symbol positions 13 display the result of the spin of their reels 12*a* to 12*c* while other reels 12*d* and 12*e* are still spinning as indicated schematically by arrows 55. In the stopped reel 12*a,* a Queen symbol Q has appeared in the middle special game position 30 while a Jack symbol J has appeared in the top special game position 30 on reel 12*c.* Reel 12*d* containing the last special game position 30 has not stopped.

Figure 15:
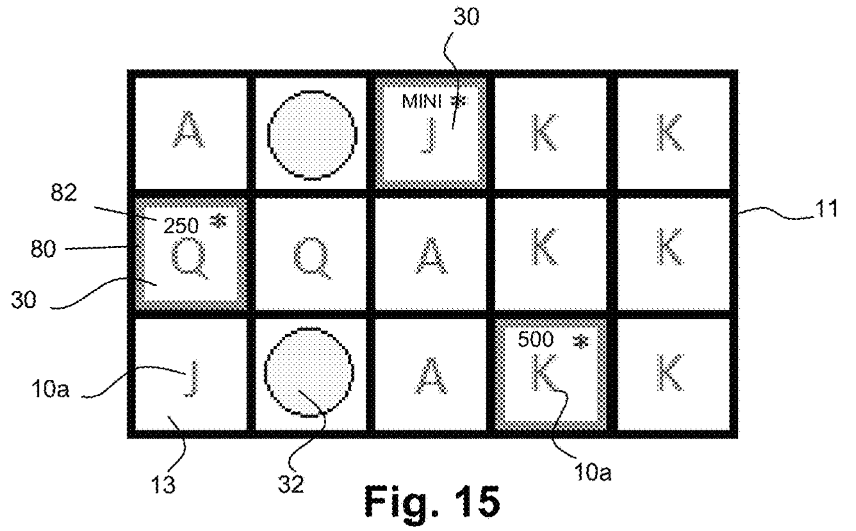

Once the reels 12 have stopped, the electronic game controller 4 determines whether any predetermined winning combinations of game symbols 10 have appeared on the player-selected pay lines 14 and prizes based on those winning combinations are awarded by the gaming machine 1. In addition, the electronic game controller assesses whether the special symbol 32 (in this embodiment being in the form of a coin symbol) has appeared in any of the special game positions 30. Where the special coin symbol 32 has not appeared in any of the special game positions 30, as best shown in FIG. 15, then no bonus prizes are awarded and the play of the base game 8 ends and the player has to make another bet to commence play of the base game 8 and spin each reel 12 in the array 11. However, the player is awarded prizes based on any winning combinations of game symbols 10 that are displayed in the symbol positions 13 in the array 11 before the base game 8 ends.

Figure 16:
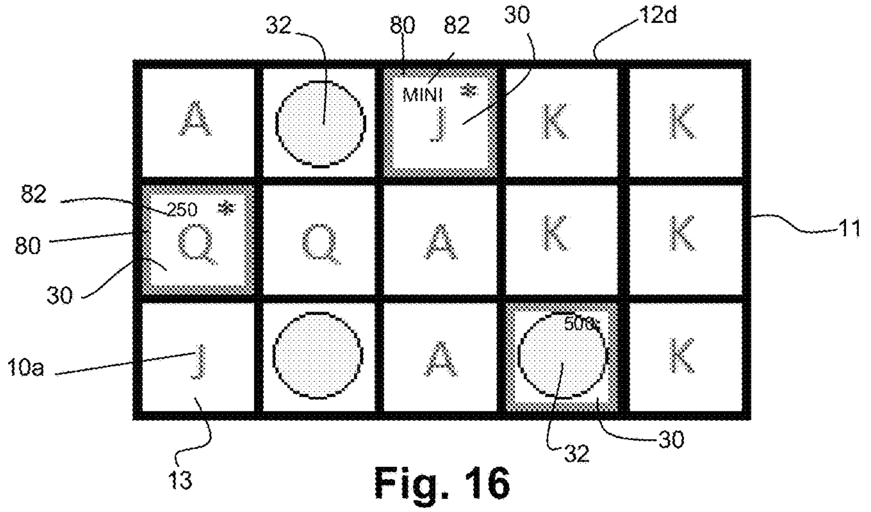
Figure 17:
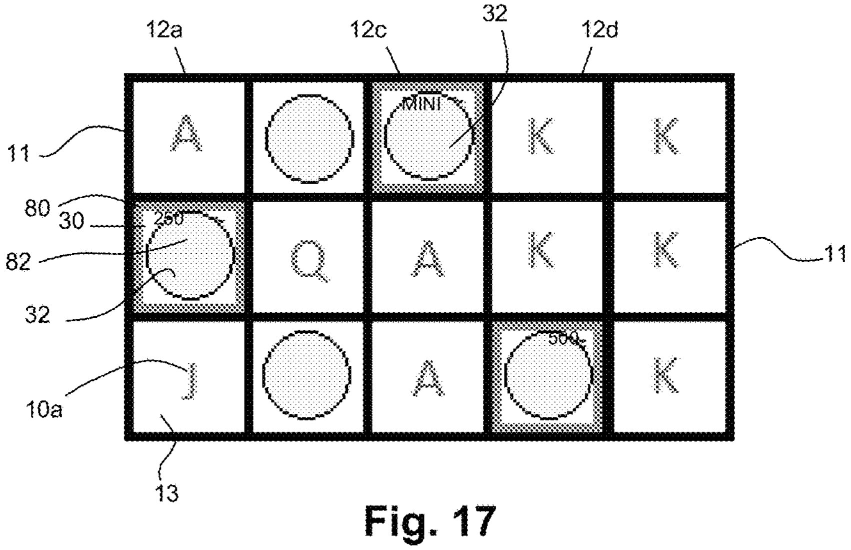
Figure 18:
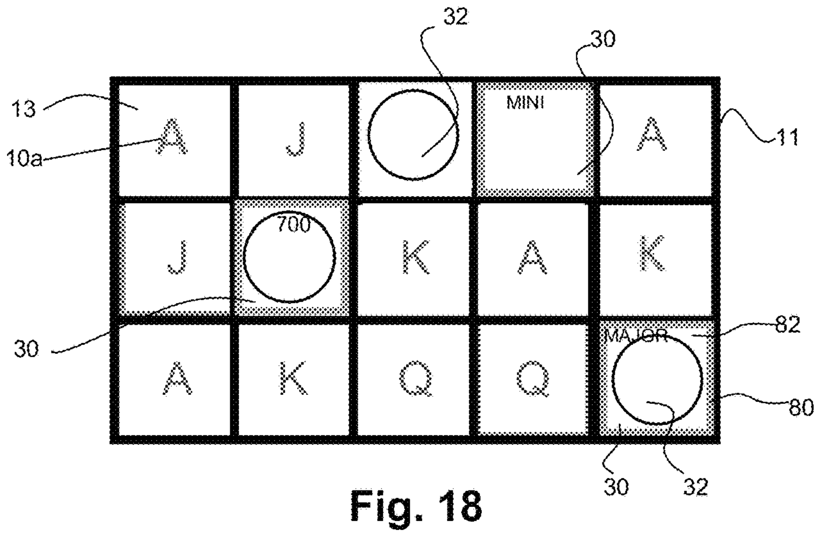

If one or more of the special game positions 30 displays a special coin symbol 32, then the player wins the bonus prize 72 that is associated with the special game positions 30 as indicated by their respective bonus prize symbols 82. Thus, the bonus prizes 72 accumulate for the player. For example, as shown in FIG. 16, another spin of the base game 8 has resulted in the special coin symbol 32 appearing in the bottom special game position 30 of the reel 12*d.* Consequently, the gaming machine 1 awards the player to associated bonus prize 72 of 500 credits as indicated by bonus prize symbol 82. In another example, a further spin of the base game 8 has resulted in the special coin symbol 32 appearing in the middle special game position 30 of the reel 12*a* and the top special game position 30 of the reel 12*c.* Consequently, the gaming machine 1 awards the player to associated bonus prizes 72 of 250 credits and the Mini jackpot prize, as indicated by bonus prize symbols 82 in the special game positions 30.

Where the bonus prize 72 is the award of free spins, then the display screen 7 transitions to the display of bonus reels to play the free spins. Where there is more than one award of free spins, then the number of free spins are accumulated and played. The bonus reels may be separate to the reels used in the feature game 9 or may constitute the feature game 9. In either case, there are prizes of enhanced value for winning combinations in the bonus reels compared to the prizes awarded in the base game 8 for the same winning combinations.

Where all three special game positions 30 display the special coin symbol 32, as best shown in FIG. 17, then not only are the bonus prizes 72 displayed with the special game positions 30 are awarded to the player but a set of free spins of the bonus reels or the feature game 9 is awarded in addition to any award of free spins as a bonus prize 72. This may be in addition to the use of other trigger or scatter symbols to trigger the feature game 9 from the base game 8.

Figure 12A:
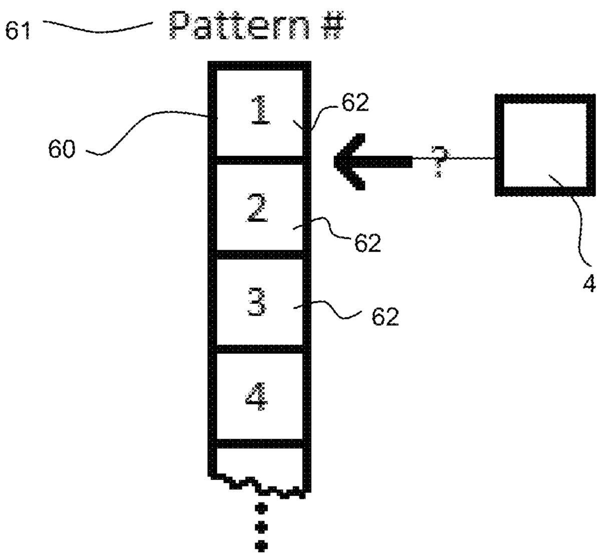
Figure 12B:
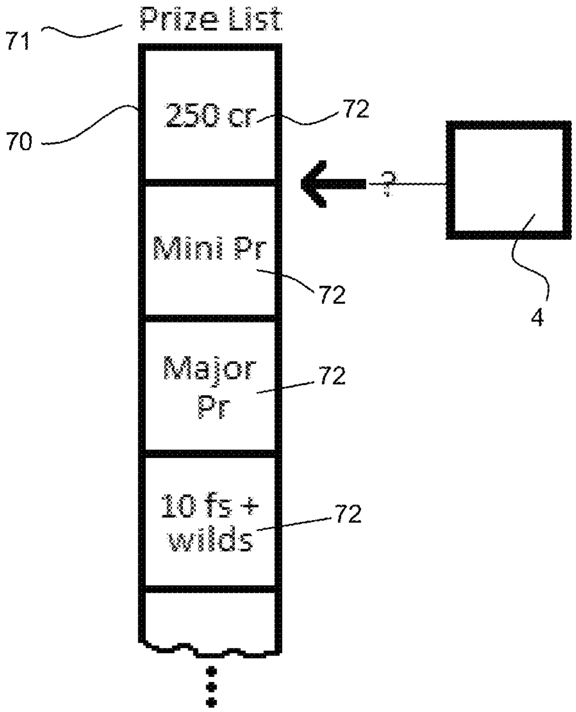

Moreover, while FIGS. 14 to 17 show that the special game positions 30 are in the same place on the reels 12 between spins, it will be appreciated that in other embodiments the special game positions 30 may move between spins of the base game 8. In this case, the electronic game controller 4 refers to the pattern list 60 after each spin to designate a fresh set of special game positions 30, as shown in FIG. 12A. This could result in the same pattern 62 (and hence same special game positions 30) being selected but it is more likely that another pattern 62 (and hence a different set of special game positions 30) will be chosen. This would also apply to the selection of the bonus prizes 72 as illustrated in FIG. 12B. That is, after each spin of the base game, the electronic game controller 4 refers to the prize list 70 and randomly selects another set of bonus prizes 72 for the next spin. It will also be appreciated that the random selection of bonus prizes 72 can occur even where a new set of special game positions 30 is not chosen but the same special game positions 30 are stay for each spin.

In other embodiments, other pattern and prize lists 60, 70 may be accessed by the electronic game controller where the patterns and prizes vary between each respective list. In one particular embodiment, the prize list 70 used by the electronic game controller 4 will vary based on the amount bet by the player. Thus, higher amount bets will permit access to prize lists with higher value bonus prizes.

In some embodiments, the bonus prizes 72 are selected after an initial random assignment of multiplier values and/or base values, where the randomly assigned multiplier and/or base values are weighted to increase as the amount of the bet made by the player to play the base game 8 increases. Another way of creating prize lists 70 is to multiply the bonus prize values from a separate fixed table by the credits bet per line. Another alternative is to use a separate prize list 70 for each of the player's possible bets, which is ideal if progressive jackpot prizes are awarded and the probability of such an award need to be controlled.

In some embodiments, the frequency of the special coin symbol 32 is controlled by choosing different reel strips to display the game symbols 10 in the base game 8. Thus, more special coin symbols 32 appear on the reels 12 as the bet made by the player increases. This means that the frequency of awarding a bonus prize increases, instead of the amount of the bonus prize increasing. There may also be a combination of frequency of the special coin symbol 32 and using different prize lists 70 with difference bonus prizes. Other embodiments may use a free spins bonus where the bonus prize values are determined by the player's initiating bet multiplier as well as which free spin is being played or by how many special coin symbols 32 have been collected or accumulated in the free spins so far.

Figure 19:
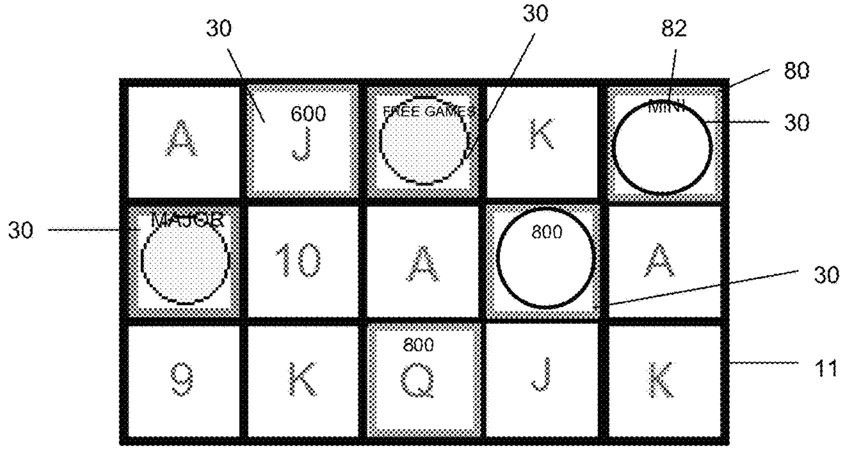

In further embodiments, the special game positions 30 may be held in place on the reels 12 when the special coin symbol 32 appears so that subsequent plays or spins of the base game 8 results in a selection of a new set of special game positions 30 to be randomly selected. Where a special game position 30 is subsequently selected that has already appeared on the reels 12, then another special game position 30 is randomly selected. In this way, the special game positions 30 gradually accumulate on the array 11 of reels 12 and so there is an increase in the probability of the player winning the bonus prizes that are randomly selected with each new spin. However, in this case, where the special coin symbol 32 appears in the special game position 30, the bonus prize 72 awarded is also held in place. After a number of spins are completed the array may be reset and the player awarded the accumulated bonus prizes. Referring to FIG. 19 as an example of this embodiment, six game positions have been designated as special game positions 30 with bonus prize symbols 82 that will change with each spin whenever the special coin symbol 32 does not appear in that special game position, such as the Jack and Queen symbols in the special game positions in reels 12*b* and 12*c*. The bonus prizes 72 already won by the player include the Major bonus prize, the Mini bonus prize, 600 credits, 800 credits and Free Games.

In some embodiments, the number of Mini and Major bonus prize symbols 82 act as multipliers for the Mini and Major bonus prizes. That is, the number of Mini and Major bonus prize symbols 82 multiplies the amount of the Mini and Major bonus prizes won by the player at the conclusion of the feature game. In other words, each Mini and Major bonus prize symbol 82 represents its own Mini and Major bonus prize that can be won multiple times.

In a variation to the embodiments of FIGS. 11 to 19, the amount of the bonus prizes 72 awarded are increased when a threshold number of special game positions 30 display the special symbol 32. Generally, the threshold number would be a majority of the special game positions 30 displayed at any one time in a spin of the reels 12. For example, in FIGS. 11 to 19, three special game positions 30 appear on the reels 12 and where two or three special game positions 30 display the coin symbol 323, then the bonus prizes 72 are enhanced by multiplying the bonus prize values by a factor of 2 (for two special game positions 30 displaying the coin symbol 32) or 3 (for three special game positions 30 displaying the coin symbol 32). It will be appreciated that different multiplier values could be used or the increase in the amount of the bonus prizes 72 may be by way of a fixed amount or a variable amount based on the number of pay lines 14 selected by the player, the amount bet per pay line made by the player and/or the amount bet by the player to play the base game 8.

In a further variation to the embodiment, additional bonus prizes or jackpots are awarded for filling a predetermined number of the special game positions 30 with the special coin symbol 32. For example, if the player is able to accumulate thirteen special game positions 30 which display the special coin symbol 32, then he or she would receive a Maxi progressive jackpot. If the player is able to accumulate fourteen special game positions 30 which display the special coin symbol 32, then he or she would receive a Super progressive jackpot. If the player is able to accumulate all fifteen special game positions 30 of the array which display the special coin symbol 32, then he or she would receive a Grand progressive jackpot. Thus, more generally, a threshold number of special game positions 30 displaying the special coin symbol 32 results in the award of a bonus prize of higher worth and in some embodiments that threshold number is a majority of the number of the available game positions 13 in the array 11.

Another variation to the embodiment awards a free spin for each special game position 30 in the array 11 that displays the special coin symbol 32. Thus, if the player completes the array 11, he or she would receive nine free spins. Thus, more generally additional plays of the game are awarded as the number of special game positions 30 displaying the special coin symbol 32 increases. Where the player still has a number of free spins remaining when the array 11 is completed, and the remaining free spins are used for the following game. Alternatively, the game also ends when all fifteen game positions 13 are special game positions 30 filled with the special coin symbol 32 and the player wins the Grand progressive jackpot.

In yet another variation to the embodiment, the bonus prize values 72 in the prize list 72 increase as more special game positions 30 appear on the array, thus increasing the value of the potential prizes to be won in the extended or expanded arrays 11 in the event that the special coin symbol 32 appears in those special game positions 30. Alternatively, the bonus prize values 72 increment with each spin of a free game by the amount of the bet made by the player.

In a further variation to the embodiment of FIGS. 11 to 19, each game or symbol position 13 comprises its own individual reel and three of the reels are grouped into columns 12*a* to 12*c* of reels. That is, each symbol position 13 has its own individual reel strip of game symbols.

Yet another variation to the embodiment of FIGS. 11 to 19 provides a feature game that is triggered when the special coin symbol 32 appears in all three special game positions 30 on the reels 12. Thus, not only does the player win the bonus prizes 72 associated with the special game positions 30, but the feature game 9 is triggered to grant the player a predetermined number of free spins of the feature game 9. As described above, the feature game 9 may take the form of a set of reels, either in the same size (same number of rows and columns), different size (unequal rows and/or columns), different shape (circular, triangular) or expanded size like array 50.

In yet another variation to the embodiment of FIGS. 11 to 19, the number of special game positions 30 that are designated by the game controller 4 in the array 11 varies or changes, depending on the amount bet by the player. For example, a minimum or threshold bet means that only three special game positions are designated by the game controller 4 for the play (spin) of the base game 8, while a medium bet means that five special game positions are designated for the spin and a maximum bet means that ten special game positions are designated for the spin. Hence, as the amount bet increases, the number of special game positions 30 designated in a spin of the base game 8 also increases. As a consequence, there is a greater probability of winning the randomly selected bonus prizes 72 that are associated with the designated special game positions 30.

While the embodiments of the invention have used a special symbol 32 in the special game position 30 to award the game enhancing element or the variable bonus prize 72, it will be appreciated that in other embodiments, a game symbol 10 is randomly selected from the available game symbols to be the special symbol for the duration of the spin of the base game 8 to introduce additional variation in the game play and awarding of the game enhancing elements or bonus prizes. Furthermore, the special symbol can be randomly chosen anew for each spin of the base game 8 to further enhance this variation in game play and awarding of game enhancing elements or bonus prizes.

Also, while the special game position has been visibly indicated to the player in the above described embodiments of the invention, in other embodiments, the designated special game positions 30 are not revealed or visually indicated until the conclusion of the spin of the base game 8. This adds further excitement and entertainment value to the base game 8 as it is unclear which game positions 13 in the reels 12 are in fact special game positions 30.

It is also noted that the embodiment of FIGS. 11 to 19 (and its variants) have been described in the context of a base game 8. However, it will be appreciated that this particular embodiment is most usefully implemented as part of a bonus or feature game 9.

Figure 20:
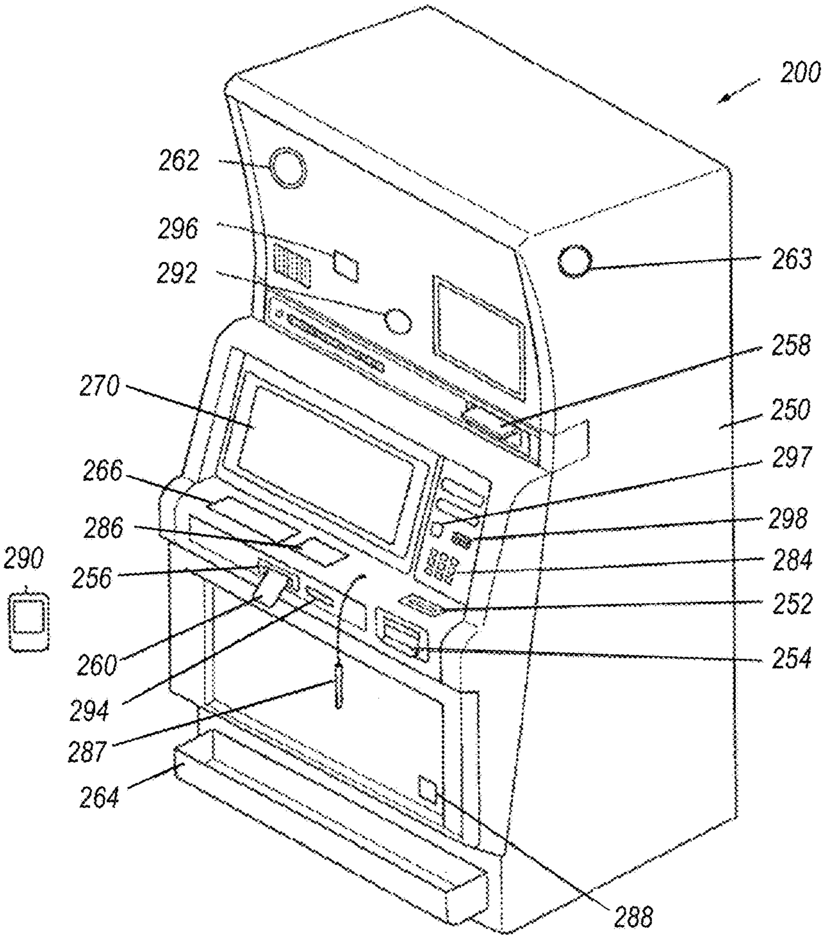
FIG. 20 is a perspective view of an electronic gaming machine according to yet another embodiment of the invention.

Referring to FIG. 20, another embodiment of the invention is shown in the form of an electronic gaming machine 200. The electronic gaming machine 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the electronic gaming machine 200. A value transfer device may include any device that can accept value from a player. The topper (not shown) may be mounted to the top of the electronic gaming machine 200.

If provided on the electronic gaming machine 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the electronic gaming machines 200 may have ticket printers 256 that may be used to print ticket vouchers 260, which could then be used by a player in other electronic gaming machines 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the player's gaming habits, etc.

The electronic gaming machine 200 may include one or more audio speakers 262, a coin payout tray 264, an input control panel 266, and a colour video display unit 270 for displaying images relating to the game or games provided by the electronic gaming machine 200. The audio speakers 262 may generate audio representing sounds such as the noise of spinning reels, a dealer's voice, music, announcements or any other audio related to a game. The input control panel 266 may be provided with a plurality of pushbuttons or touch-sensitive areas that may be pressed by a player to select games, make wagers, make gaming decisions, etc.

Figure 21:
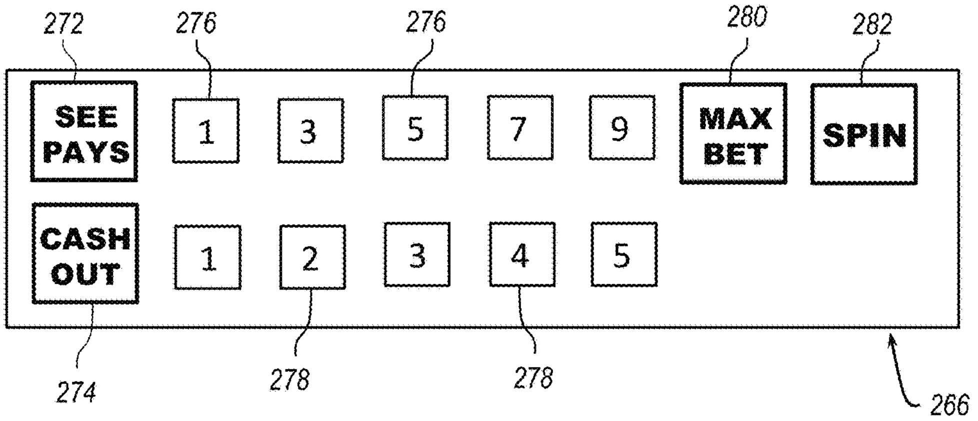
FIG. 21 is a schematic drawing of a control panel for the electronic gaming machine of FIG. 20.

FIG. 21 illustrates one possible embodiment of the control panel 266, which may be used where the electronic gaming machine 200 having a plurality of reels. The control panel 266 may include a "See Pays" button 272 that, when activated, causes the display unit 270 to generate one or more display screens showing the odds or payout information for the game or games provided by the electronic gaming machine 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the electronic gaming machine 200, in which case the electronic gaming machine 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the electronic gaming machine 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ 0 per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 21, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the electronic gaming machine 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the electronic gaming machine 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the electronic gaming machine 200 may include a mechanism by which the electronic gaming machine 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The electronic gaming machine 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The electronic gaming machine 200 may include any one of the devices 258, 284, 286, 288, 290, 292, 294, 296, 297, 298, or the electronic gaming machine 200 may include a combination of some or all of the devices 258, 284, 286, 287, 288, 290, 292, 294, 296, 297, 298.

In operation, a player may identify him or herself to the electronic gaming machine 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the electronic gaming machine 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 22:
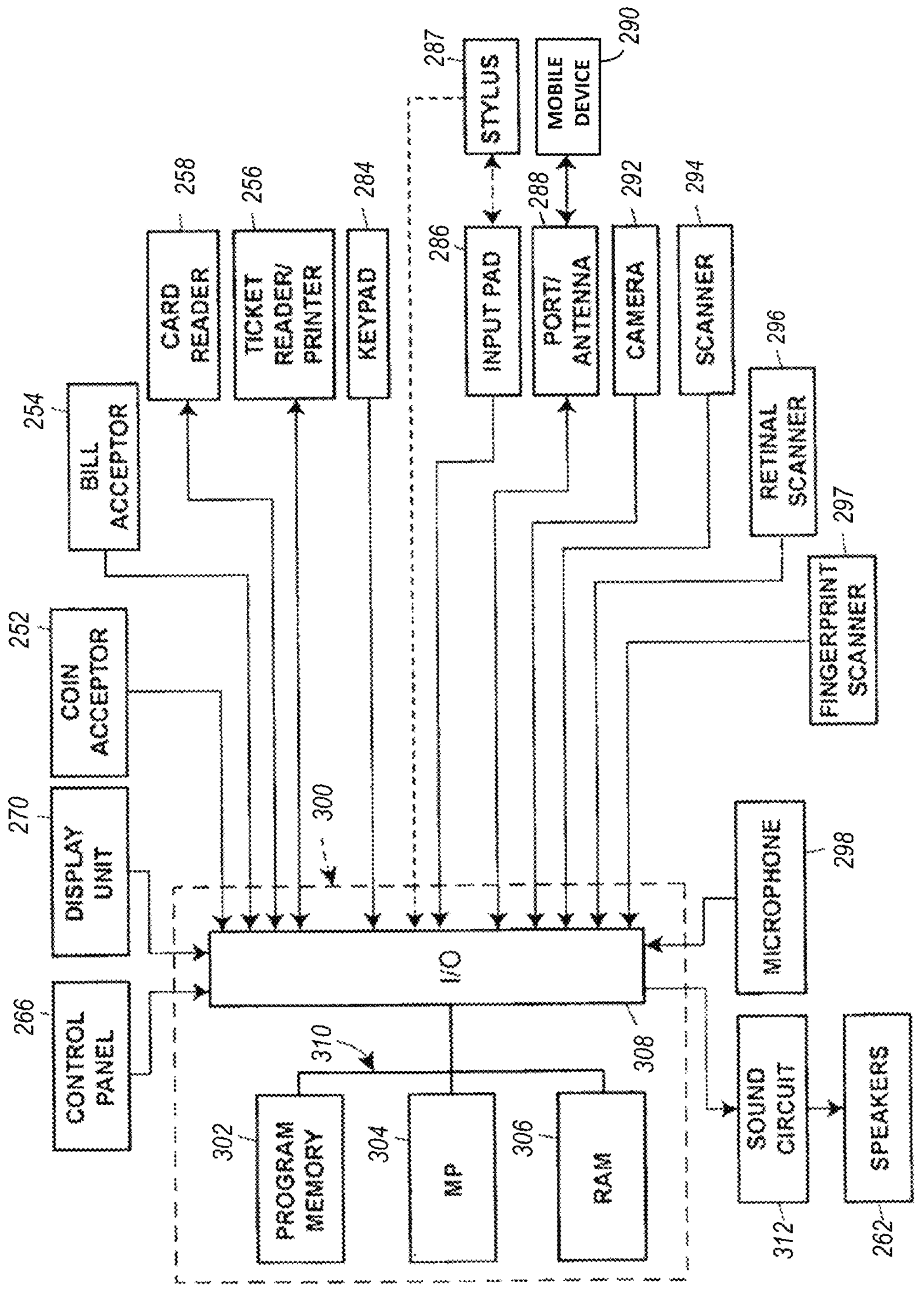
FIG. 22 is a block diagram of the electronic components of the electronic gaming machine of FIG. 20.

FIG. 22 is a block diagram of a number of components that may be incorporated in the electronic gaming machine 200. Referring to FIG. 22, the electronic gaming machine 200 may include a controller 300 that may comprise a program memory 302, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 108 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 22 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 22, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 21 may be connected to the I/O circuit 308 via a common bus or other data link that is shared by a number of components. Furthermore, some of the components may be directly connected to the microprocessor 304 without passing through the I/O circuit 308.

In some embodiments, a feature game trigger event occurs in the base game to trigger the feature game. In one embodiment, the feature game trigger event comprises a random event determined by the electronic game controller at the start of play of the feature game. In another embodiment, the feature game trigger event comprises the appearance of at least one trigger symbol in the base game array. In another alternative, the feature game trigger event comprises an in-game event during play of the base game.

In some embodiments, in response to a feature game trigger event in the base game, the game controller causes the display to display game symbols for playing the feature game. Alternatively, the game controller causes the display of the feature game and the base game during play of the base game, the feature game being inactive until triggered. In this embodiment, the change in the feature game from being inactive to active may be indicated on the display. This indication may be visual, aural or a combination of both.

In some embodiments, the gaming machine comprises an input device for receiving commands from the player to play the game, wherein the input device comprises one or more buttons in electronic communication with the game controller to transmit the player commands to the game controller.

In some embodiments, the input device comprises one or more buttons on the housing, the buttons being in electronic communication with the game controller. In other embodiments, the buttons are arranged on a console of the housing. Alternatively or additionally, the input device comprises a touch sensitive surface on the display for receiving commands from the player, the touch sensitive surface being in electronic communication with the electronic game controller to transmit the player commands to the game controller.

In some embodiments, the gaming machine comprises a value transfer mechanism for receiving value from the player to make a bet and initiate a play of the game. In other embodiments, the value transfer mechanism also pays the prizes to the player using value in an amount equal to an awarded prize. It is further preferred that the housing comprises the value transfer mechanism. In one embodiment, the value transfer mechanism comprises one or more vending slots for paying and/or receiving value. In other embodiments, the value transfer mechanism comprises a value input/value output device. In further embodiments, the value transfer mechanism comprises a coin slot or acceptor, a paper currency acceptor, a ticket reader and/or printer or a card reader and/or writer.

In some embodiments, the bonus prize is selected from a range of bonus prize values. In some embodiments, said range of bonus prize values is determined by the bet made by said player. Preferably, the bonus prize values increase as the bet made by said player increases.

In some embodiments, said game controller determines a new bonus prize for association with said at least one special game position for each subsequent play of said game in which said special symbol does not appear in said at least one special game position.

In some embodiments, said at least special game position stays the same between a first play and a second play of said game when said special symbol appears in said at least one special game position in said first play.

In some embodiments, said game controller designates a different game position as said at least one special game position between two plays of said game. In other embodiments, said game controller designates said different game position as an additional special game position where said at least one special game position displays said special symbol.

In some embodiments, a threshold number of special symbols displayed in said special game positions results in the award of a bonus prize of higher worth. In other embodiments, said threshold number of special symbols comprises a majority of the number game positions in said array.

In some embodiments, additional plays of said game are awarded as the number of special symbols displayed in said special game positions increase.

In some embodiments, each said game position comprises a reel separate to the other game positions.

In some embodiments, the number of special game positions that are designated changes or varies depending on the amount bet for a play of the game. In some embodiments, the number of special game positions that are designated increase as the amount bet for a play of the game increases.

In some embodiments, said at least one special game position and said bonus prize are visually indicated on said array during said play. In some embodiments, said special game position is visually indicated on said array to said player during said play by a graphical element associated with said special game position. In some embodiments, said graphical element comprises a graphically enhanced element. In some embodiments, said graphical element comprises a highlighted boundary of said special game position. In some embodiments, said graphical element comprises an animation associated with said special game position. In other embodiments, said animation comprises an animation of said special game position or said boundary. In some embodiments, said graphical element comprises an animation of said special symbol appearing in said special game position.

In some embodiments, said graphical element is displayed on said display at all times on said electronic gaming machine. Alternatively, said graphical element is displayed from the start of a play of said game until the end of said play. That is, the graphical element is only displayed once the special game position is designated at the start of said play prior to the reels being spun, or at least before the reels have displayed any game symbols for the result of the play of the game and remains in position until the end of said play when all reels have completed spinning and the associated results of the play of the game are known to the player. In an alternative embodiment, the special game position is visually indicated only at the conclusion of the play of the game.

In some embodiments, said graphical element comprises an area within said array associated with said special game position. In other embodiments said associated area changes in response to said special symbol appearing in said special game position.

In some embodiments, the special symbol is randomly selected from said game symbols. In other embodiments, the special symbol is selected from said game symbols according to a predetermined order.

In some embodiments, said game enhancing element comprises at least one or more of a predetermined number of free games, a win multiplier, wild multipliers, bonus wilds, symbols that cause the award of additional free games, trigger symbols to retrigger said at least two second arrays, held columns, random wild symbols, stacked symbols, bonus symbols, new game symbols, reveal symbols, progressives, bonus credits, jackpot symbols, and one or more symbol replacements.

In some embodiments, said game enhancing element comprises the designation of a group of predetermined game positions on said array as resultant game positions such that game symbols appearing in said resultant game positions change into at least one other game symbol. In other embodiments, said game symbols change into a substitute symbol. In one preferred form, said array comprises rows and columns of predetermined game positions and said resultant game positions comprise the predetermined game positions in the same column as said special game position. Alternatively or additionally, said resultant game positions comprise the predetermined game positions in at least one column adjacent to the column containing said special game position. In a particularly preferred example of this alternative or additional form, said resultant game positions comprise the predetermined game positions in each column adjacent to and on either side of the column containing said special game position.

In some embodiments, said electronic game controller designates a different predetermined game position as said special game position between two plays of said game. In other embodiments, said two plays are successive plays of said game. In an alternative form, said two plays are the first and last plays of a predetermined number of plays of said game.

In some embodiments, there is a plurality of special game positions on said array. In other embodiments, said array comprises rows and columns of predetermined game positions and at least one of said columns comprises only said special game positions. In one preferred form, said special game positions are respectively associated with different game enhancing elements.

Where said game enhancing element comprises the designation of a group of predetermined game positions on said array as resultant game positions such that game symbols appearing in said resultant game positions change into at least one other game symbol, it is preferred that different groups of predetermined game positions can be designated as resultant game positions. In one preferred form, there is a plurality of said special game positions and each of said special game positions are respectively associated with said different groups. In another preferred form, said at least one of said special game positions is associated with one of said groups in a base game and is associated with another of said groups in a feature game.

In some embodiments, the game comprises a base game and a feature game. In other embodiments, at least one special game position is available for play in only said base game, only said feature game or both said base game and said feature game.

In some embodiments, said base game and said feature game each comprises an array of rows and columns of said predetermined game positions, and said base game array is different in size and/or dimensions to said feature game array. In other embodiments, said feature game array is greater in size than said base game array. In one preferred form, said base array comprises three rows and five columns and said feature game array comprises either more than three rows or more than five columns. In a further preferred form, said feature game array is an extended base game array.

In other embodiments, said electronic game controller designates a different predetermined game position as said special game position between a play of said base game and a play of said feature game.

In some embodiments, a feature game trigger event occurs in said base game to trigger said feature game. In one preferred form, said feature game trigger event comprises a random event determined by said electronic game controller at the start of play of said feature game. In another preferred form, the feature game trigger event comprises the appearance of at least one trigger symbol in said base game array. In another alternative, the feature game trigger event comprises an in-game event during play of the base game.

In some embodiments, said one or more game enhancing elements modify the result of a play of said game.

In some embodiments, said array (including the base game array and/or the feature game array) take any one of a circular, triangular, oval, semi-circular, hexagonal, pentagonal, octagonal, non-rectangular or polygonal shape. In one preferred form, said wheels and said enhanced wheels arrays take the form of partially shown circular wheels.

In some embodiments, the player selectively starts and/or stops play of said base game array and/or said feature game array.

In some embodiments, the gaming machine comprises a mobile electronic gaming device. In other embodiments, said mobile electronic gaming device comprises a handheld electronic device. In one preferred form, said handheld electronic device comprises a handheld electronic gaming device or a smart phone. Alternatively, said gaming machine comprises a computer. In other embodiments, said computer is connected to a communication network.

In other embodiments, the game controller is configured to visually indicate said special game position to said player during said play by a graphical element associated with said special game position and visually indicate said bonus prize to said player during said play.

In other embodiments, the said display controller visually indicates said special game position to said player during said play by displaying a graphical element associated with said special game position. The display controller may also visually indicate said bonus prize to said player during said play.

In some embodiments, the method comprises visually indicating said special game position and said bonus prize on said array during said play.

In some embodiments, the method comprises associating a graphical element with each said special game position to visually indicate each said special game position to said player.

In some embodiments, said associating step further comprises graphically enhancing the visual appearance of said special game position. In some embodiments, said associating step further comprises highlighting a boundary of said special game position. In some embodiments, said associating step further comprises associating an animation with said special game position. In other embodiments, said associating step further comprises animating said special game position or said boundary.

In some embodiments, said method further comprises displaying said graphical element on said display at all times on said electronic gaming machine. Alternatively, said method further comprises displaying said graphical element from the start of a play of said game until the end of said play. In some embodiments, said associating step further comprises changing an area within said array associated with said special game position in response to said special symbol appearing in said special game position.

In some embodiments, the method further comprises designating a group of predetermined game positions on said array as resultant game positions and changing game symbols appearing in said resultant game positions into at least one other game symbol. In other embodiments, said game symbols change into a substitute symbol.

In some embodiments, the method comprises designating said special game position in only a base game, only a feature game or both said base game and said feature game. In other embodiments, said base game and said feature game each comprises an array of rows and columns of said predetermined game positions, and said method further comprises displaying said base game array in a different size and/or dimensions to said feature game array. In one preferred form, said feature game array is greater in size than said base game array. In another preferred form, said base array comprises three rows and five columns and said feature game array comprises either more than three rows or more than five columns.

In some embodiments, said designating step comprises designating a different predetermined game position as said special game position between two plays of said game.

In some embodiments, said method further comprises providing a plurality of said special positions. In other embodiments, where said awarding step comprises designating a group of predetermined game positions as resultant game positions, said awarding step further comprises designating different groups of predetermined game positions as resultant game positions and respectively associating said special game positions with said different groups.

In some embodiments, said designating step comprises designating said special game position in only a base game, only a feature game or both said base game and said feature game. In other embodiments, said base game and said feature game each comprises an array of rows and columns of said predetermined game positions, further comprising displaying said base game array in a different size and/or dimensions to said feature game array. In one preferred form, said feature game array is greater in size than said base game array. In another preferred form, said base array comprises three rows and five columns and said feature game array comprises either more than three rows or more than five columns.

In some embodiments, said designating step comprises designating a different predetermined game position as said special game position between a play of said base game and a play of said feature game.

In some embodiments, the method comprises the designation of a group of predetermined game positions on said array as resultant game positions such that game symbols appearing in said resultant game positions change into at least one other game symbol, said awarding step further comprises designating different groups of predetermined game positions as resultant game positions and associating at least one of said special game positions is associated with one of said different groups in said base game and is associated with another of said different groups in said feature game.

In other embodiments, the gaming machine 1 also offers the player the opportunity to play in community games against other players in so-called tournament games, or even in player versus player games. This is typically implemented by electronically linking several gaming machines 1 in a group within a gaming venue. The player versus player or tournament game can be played simultaneously by the players or can be staggered, with some players playing at one time and some players playing at another time in the same game. In this situation, the player versus player or tournament game comprises the award of an additional bonus prize in addition to the jackpot prizes in said selected available jackpot set.

While the same game format is essentially used across the base game 8 and feature game 9, it will be appreciated that the game format may vary across the base and feature games, as well as between base games where more than one game is offered by the same electronic gaming machine 1. For example, one of the games 8 may be a wheel-type game or a four reel game and another of the games may be a standard five reel game. Similarly, the games 8 may each have different game symbols, game rules and pay tables that are unique to each game.

While one embodiment of the invention has been described in relation to a base game 8 and a feature game 9, it will be appreciated that the invention could include one or more additional feature games that are triggered by specific trigger symbols appearing in the feature game 9. Also, the additional feature games may also have trigger symbols that trigger further feature games in a cascading fashion. These additional and further feature games could have the same game play elements as the feature game 9 or be different feature games entirely.

In other embodiments, the base game 8 (and the feature game) need not be displayed on a single video screen 7. Instead, they may be displayed on separate video screens, with the lower playing area 7*a* appearing in a lower video screen and the upper display area 7*b* on an upper video screen. Also, the order can be reversed, with the playing area 7*a* appearing on an upper video screen or upper part of a single video display screen 7 and the display area 7*b* appearing on a lower video screen or lower part of a single video display screen.

In another embodiment, the video screen 7 is a touch screen for use in addition to the player-actuatable buttons 6 so as to enable the player to select the bet level (such as bet denominations or bet per pay line 14) as well as other various features, such as making monetary bets for the game, initiating play of any base and feature games played and responding to any messages or requests issued on the gaming machine 1 by the electronic game controller 4. In this case, the player may control when the reels 12 start spinning and stop spinning, either individually or collectively, by simply touching the reels 12. Control over spinning of the reels 12 can also be implemented through the buttons 6 on the console 3. This increases player interaction and provide the player with an opportunity to guess when a particular game symbol 10 may appear in the reels 12.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer programme configured to perform the invention. In this way the invention can be implemented in various ways on a gaming machine. In a further aspect, the invention includes a gaming system configured comprising a central processing unit (such as a computer or computational processor) configured for communication with a gaming machine to perform the invention. In a yet another aspect, the invention includes a non-transitory computer readable or carrier medium carrying computer executable code that, when executed on a central processing unit configured for communication with a gaming machine, causes said central processing unit to perform the invention. In this case, the non-transitory carrier medium includes an external hard drive, a memory device, including a memory card, smart card, a radio frequency identification (RFID) device, USB key, magnetic card or other electronic storage device.

While the illustrated embodiments include an electronic display on which the array of game positions is displayed, it will be recognized that the disclosed embodiments could instead incorporate mechanical or electro-mechanical reels to define the array of game positions. In fact, to the extent that the game positions, game symbols or operation of the gaming machine described herein would require a modification of such mechanical or electro-mechanical reels, it will be recognized that the embodiment represents a change in the structure or operation of a machine, rather than simply a variation in the rules of playing a game. In addition or in the alternative, the variation in the game positions, game symbols or operation of the gaming machine described herein may be viewed as analogous to a method for utilizing a new game apparatus (like a new deck of cards), rather than simply as a new set of rules in and of themselves.

Thus, for a mechanical or electro-mechanical gaming machine, the game controller, such as the electronic game controller 4, would be in communication with a motor that rotates the mechanical reels with their reel strips bearing the game symbols 10 and special symbols 32. The association of the randomly selected bonus prize with the designated special game position 30 may be implemented in various ways. For example, the gaming machine may use different reel strips marked with the designated special game positions 30, in which case the pattern list 60 is used to choose the appropriate reel strip corresponding to the selected pattern 62. In another example, a secondary transparent reel is provided for each mechanical reel that has the designated special game positions 30 marked. The transparent reels rotate independently of the mechanical reels to move the designated special game positions 30 in compliance with the selected pattern 62. Sensors linked to the mechanical reels and the transparent reels indicate which game symbols are displayed in the window and whether the special game symbol 32 has appeared in the special game position 30. The sensors communicate this information to the game controller so that the game controller is able to award prizes based on winning combinations of game symbols displayed on the reels and any bonus prizes associated with the special game positions. The random selection of the bonus prize associated with each special game position 30 is determined internally by the game controller.

It will further be appreciated that any of the features in the preferred embodiments of the invention can be combined together and are not necessarily applied in isolation from each other. For example, the feature of the player being able to selectively starting or stopping spinning of the reels 12 and the feature of providing separate video screens for the lower playing area 7*a* and upper display area 7*b* can be combined into a single gaming machine 1. Similar combinations of two or more features from the above described embodiments or embodiments of the invention can be readily made by one skilled in the art.

By providing a special game position that can award a variable bonus prize, which are visually indicated to the player during game play, the operation of the gaming machine is improved compared to existing prior art gaming machines as the gaming machine of the invention is able to provide an immediate bonus prize to the player upon the appearance of the special symbol in the special game position. This improved operation of the gaming machine increases the excitement and entertainment value as there is more chance of winning additional prizes. This excitement and entertainment value is also heightened as the exact bonus prize that may be won upon the appearance of a special symbol in the special game position is known due to the special game position in the (base and/or feature) game. The invention also adds greater value in terms of the probability of winning a prize and providing greater variety in game play, especially compared to a conventional gaming machine that only has one set of reels and a single feature game. All these advantages of the invention result in the gaming machine becoming of greater entertainment value due to the variation in game play on the gaming machine. Furthermore, since the game controller controls operation of the gaming machine, the invention can be readily implemented to existing gaming machines, including EGMs, electro-mechanical or purely mechanical gaming machines as well as other gaming systems. In all these respects, the invention represents a practical and commercially significant improvement over the prior art.

Although the invention has been described with reference to specific examples, it will be appreciated by those skilled in the art that the invention may be embodied in many other forms. In particular, reference is made to U.S. Ser. No. 14/330,143 and its priority application Australian Patent Application No. 2013902611, whose specifications as filed are hereby incorporated by reference in their respective entirety.

The invention claimed is:

1. A gaming machine comprising:

a display for displaying a game, wherein said game comprises game symbols randomly displayed in an array of game positions and where predetermined winning combinations of randomly selected game symbols in said game award prizes to a player;

a game controller for controlling the display of said game symbols on said display, wherein said game controller designates at least one of said game positions as a special game position on said array in a play of said game and randomly determines a bonus prize associated with said at least one special game position; and a value transfer mechanism for receiving value from said player, wherein said game controller communicates with said value transfer mechanism to determine whether a threshold amount of value has been received to initiate said play;

wherein upon receipt of said threshold amount of value from said player via said value transfer mechanism, said game controller commences a play of said game; and wherein a special symbol appearing in said at least one special game position in said play causes said game controller to award said bonus prize associated with said at least one special game position.

2. The gaming machine of claim 1, wherein said bonus prize is selected from a range of bonus prize values.

3. The gaming machine of claim 2, wherein said range of bonus prize values is determined by the bet made by said player.

4. The gaming machine of claim 2, wherein the bonus prize values increase as the bet made by said player increases.

5. The gaming machine of claim 2, wherein the frequency of bonus prize values increase as the bet made by said player increases.

6. The gaming machine of claim 1, wherein said game controller determines a new bonus prize for association with said at least one special game position for each subsequent play of said game in which said special symbol does not appear in said at least one special game position.

7. The gaming machine of claim 1, wherein said at least special game position stays the same between a first play and a second play of said game when said special symbol appears in said at least one special game position in said first play.

8. The gaming machine of claim 1, wherein said game controller designates a different game position as said at least one special game position between two plays of said game.

9. The gaming machine of claim 8, wherein said game controller designates said different game position as an additional special game position where said at least one special game position displays said special symbol.

10. The gaming machine of claim 1, wherein a threshold number of special symbols displayed in said special game positions results in the award of a bonus prize of higher worth.

11. The gaming machine of claim 10, wherein said threshold number of special symbols comprises a majority of the number game positions in said array.

12. The gaming machine of claim 1, wherein additional plays of said game are awarded as the number of special symbols displayed in said special game positions increase.

13. The gaming machine of claim 1, wherein each said game position comprises a reel separate to the other game positions.

14. The gaming machine of claim 1, wherein said at least one special game position and said bonus prize are visually indicated on said array during said play.

15. The gaming machine of claim 14, wherein said special game position is visually indicated on said array to said player during said play by a graphical element associated with said special game position.

16. The gaming machine of claim 15, wherein said graphical element comprises a highlighted boundary of said special game position.

17. The gaming machine of claim 15, wherein said graphical element is displayed on said display at all times on said gaming machine.

18. The gaming machine of claim 15, wherein said graphical element is displayed from the start of a play of said game until the end of said play.

19. The gaming machine of claim 1, wherein the number of special game positions that are designated changes or varies depending on the amount bet for a play of the game.

20. The gaming machine of claim 1, wherein said bonus prize comprises at least one or more of a predetermined number of free games, bonus symbols, progressives, bonus credits and jackpot symbols.

21. The gaming machine of claim 1, wherein the special symbol is randomly selected from said game symbols.

22. The gaming machine of claim 1, wherein there is a plurality of said special game positions on said array, each being associated with a bonus prize.

* * * * *